United States Patent
Hopfe et al.

(10) Patent No.: US 6,708,571 B1
(45) Date of Patent: Mar. 23, 2004

(54) TEMPERATURE COMPENSATED ROTARY METER

(75) Inventors: Helmut W. Hopfe, Erie, PA (US); Alexander R. Podgers, Lake City, PA (US)

(73) Assignee: American Meter Company, Erie, PA (US)

( * ) Notice: Subject to any disclaimer, the term of this patent is extended or adjusted under 35 U.S.C. 154(b) by 0 days.

(21) Appl. No.: 10/065,458

(22) Filed: Oct. 21, 2002

(51) Int. Cl.[7] ............................................. G01F 1/05
(52) U.S. Cl. ......................................... 73/861.79
(58) Field of Search .................... 73/861.79, 861.71, 73/861.84, 861.91, 861.33

(56) References Cited

U.S. PATENT DOCUMENTS

| | | | | |
|---|---|---|---|---|
| 4,534,226 A | * | 8/1985 | Rose | 73/861.84 |
| 5,003,828 A | * | 4/1991 | van den Burg | 73/861.33 |
| 5,325,729 A | * | 7/1994 | Goodson et al. | 73/861.91 |
| 5,509,305 A | * | 4/1996 | Husain et al. | 73/195 |
| 5,689,071 A | * | 11/1997 | Ruffner et al. | 73/861.84 |
| 5,728,950 A | * | 3/1998 | Boulanger | 73/861.79 |
| 5,866,824 A | * | 2/1999 | Schieber | 73/861.79 |

* cited by examiner

*Primary Examiner*—Edward Lefkowitz
*Assistant Examiner*—Jewel V. Thompson

(74) *Attorney, Agent, or Firm*—Edward W. Goebel, Jr.; Jon L. Woodard; MacDonald, Illig, Jones & Britton LLP

(57) ABSTRACT

A temperature compensated fluid meter includes a temperature transducer with a bellows that expands and contracts. Movement of a rod attached to a movable end of the bellows is coupled to a transmission assembly which includes a cylinder and a cone that have a transfer ring mounted between them. The actuator rod is interconnected with the transfer ring to move it substantially linearly and continuously along the axis of the cylinder in response to changes in the temperature of the fluid being measured. This changes the speed of rotation of the cone with respect to the cylinder for a particular volume of fluid as the temperature of the fluid changes. A cone shaft in which the cone is mounted is interconnected with the compensated index within the register so as to substantially linearly and continuously cause the index to record a temperature compensated fluid volume. A pair of elastomeric expanders in the mounting assembly for the cylinder's shaft flex in response to a force exerted on the cone by a spring that biases the cone, mounted at an angle to the cylinder, toward the cylinder. The flexing of the elastomeric expanders minimizes the effects of discontinuities in the size and shape of the ring, the cylinder and the cone during their rotation. A register cover attached to the fluid meter has at least one side rib extending from a location adjacent each of a plurality of mounting holes in a mounting flange at an open end of the register cover. Radially extending closure ribs, corresponding to the side ribs, are located within the register cover and on a closed end of the cover and extend toward the center of the closed end. In some figures an end of each of the closure ribs is attached to a flange on the closure end of the register cover.

13 Claims, 22 Drawing Sheets

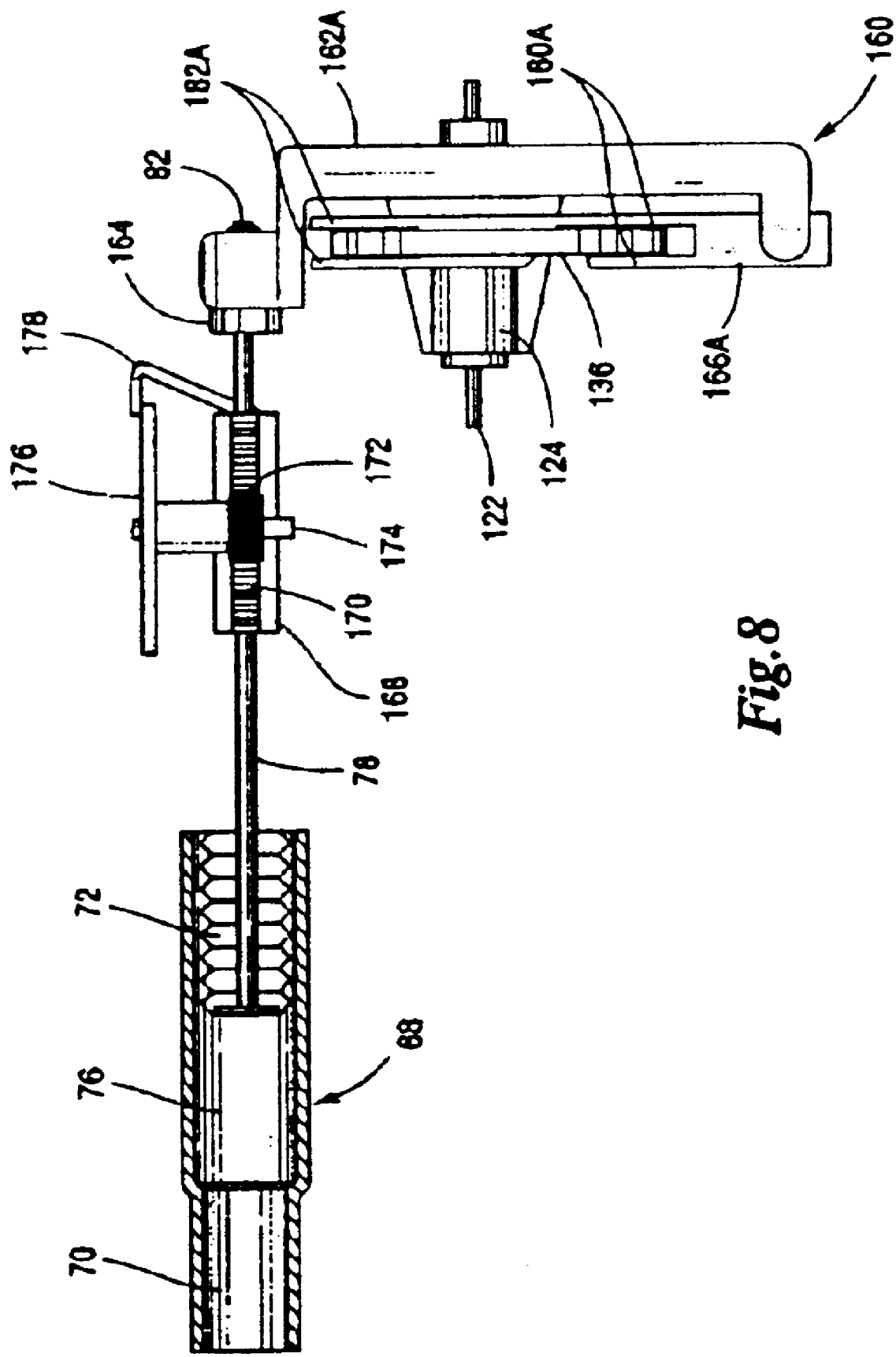

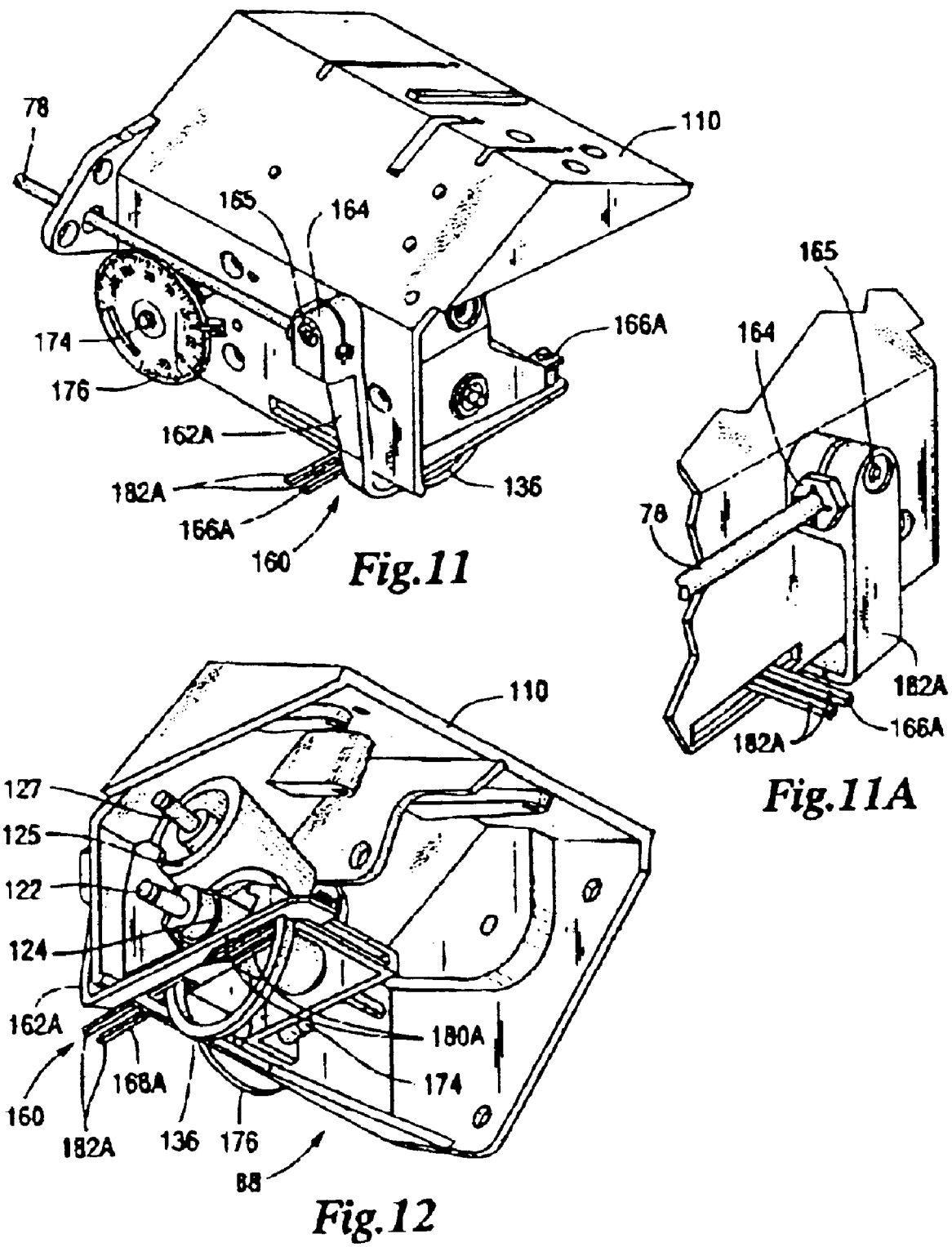

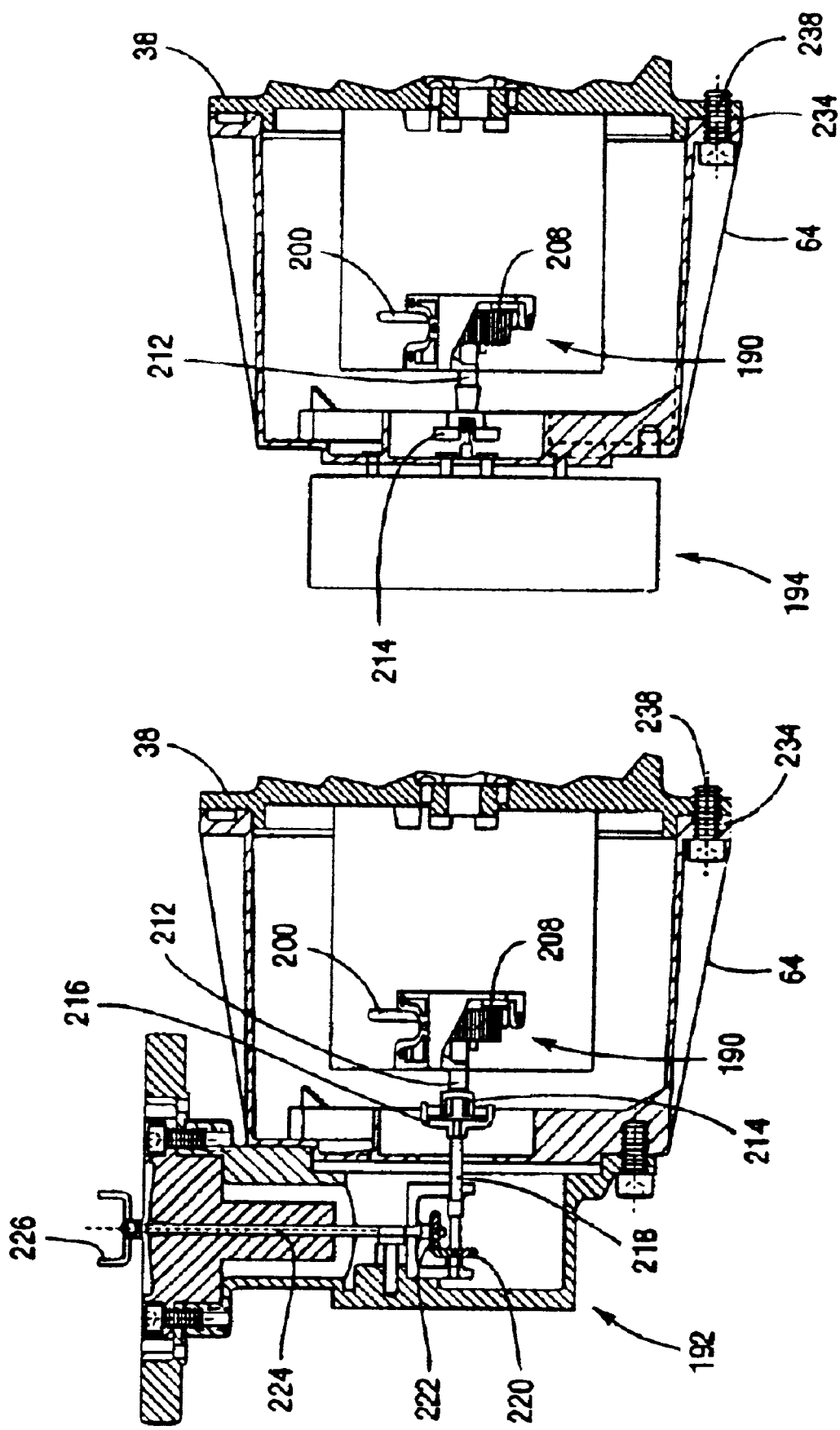

TEMPERATURE COMPENSATED ROTARY METER

BACKGROUND OF INVENTION

This invention relates to temperature compensated rotary fluid meters. While this invention may be applicable to rotary meters which measure the flow of many types of fluids, it will be explained, by way of example, with respect to meters which measure the flow of gas for which it is particularly advantageous.

The density of a fluid, such as natural gas, used for producing heat, and thus its heating capability per unit of volume delivered, varies inversely and proportionately with changes in the temperature of the gas according to the principles of Charles Law. That is, the density of gas, and its heating capacity, decreases with increases in temperature and increases with decreases in temperature. The cost of gas delivered to a customer is normally billed at a set amount per unit of volume, at a selected density, which is measured at a preselected base temperature such as 60° F. Where transmission pipeline pressure is constant, variations in gas density due to temperature changes result in an under-registration of gas heating capacity flow through the meter at temperatures below the base temperature and an over-registration of gas heating capacity flow through the meter at temperatures higher than the base temperature. Many large gas users require suppliers to use a temperature compensated meter to correct the readings of gas meters due to variations of the temperature of the metered gas.

There are many types of rotary fluid meters which have been developed. Each of these meters includes one or more impellers which rotate at speeds that vary with the volume of fluid flowing through the meter. The rotation of an impeller is used to turn one or more mechanical indices in a register used to show the volume of a fluid, such as gas, which passes through the meter. Temperature compensated fluid meters normally include a temperature transducer which converts changes of temperature into some type of motion and a register with either just a temperature compensated index or with a temperature compensated index and an uncompensated index. Temperature compensated meters also include a transmission assembly for directing uncompensated revolutions from the impeller to the uncompensated register (if one is used) and for varying the uncompensated revolutions in proportion to the changes in temperature of the fluid being measured from a selected base temperature, as well as a mechanism for interconnecting the temperature transducer with the transmission assembly. Previous temperature compensated fluid meters also include register covers which not only fit over and protect the index or indices, the transmission assembly and associated mechanisms, but also allow for the attachment of various meter accessories, such as automated meter reading devices, pressure compensating devices and the like, to the covers.

Many of these temperature compensated rotary meters have certain disadvantages which have affected their performance. For example, certain of these meters utilize temperature transducers with bimetal elements or transducers with helical structures which produce a rotary motion with a low driving force in response to changes in temperature. The interface of these transducers with adjustment mechanisms in the meters typically results in a non-linear motion, producing undesired errors in the temperature compensated measurement of gas. Other temperature compensating meters use intermittently operating devices in their transmission assemblies to provide a temperature compensated measurement of gas. It is necessary to prove all meters to determine their accuracy. The use of intermittently operating devices for temperature compensation requires a more difficult and relatively uneconomical, larger-volume throughput of a fluid being measured, such as gas, to prove these meters to compensate for the time intervals between the periods during which these intermittently operating mechanisms are idle.

Some temperature compensated fluid meters use the combination of a cone, a cylinder and a transfer ring surrounding the cylinder in a transmission assembly for varying the uncompensated revolutions from an impeller in proportion to changes in temperature of the fluid being measured. However, these meters feature a non-linear interface with their transducers. Additionally, the cone, cylinder and transfer ring are typically machined from hardened metal. The axis of rotation of the cone is set at an angle with respect to the axis of rotation of the cylinder so that the surfaces of the cone and the cylinder are parallel with one another. The transfer ring is mounted so that it contacts the surfaces of both the cylinder and the cone and is in a driving relationship between them so that a traction force results. The transfer ring is also transferred along the length of the axis of the cylinder in response to changes in the temperature of the fluid being measured to change the relative speeds of rotation of the cylinder and the cone. The use of this type of mechanism for temperature compensation in fluid meters has been limited because the precise fit needed between the cone, the cylinder and the transfer ring to prevent the mechanism from binding up or otherwise malfunctioning has required relatively expensive precision machining of these components to precise dimensions with tight tolerances and additional adjustment mechanisms for traction adjustment Temperature compensated fluid meters often have plastic register covers to protect the register and its one or two indices, its transmission assembly and other components extending from the register end of the meter. There is often a requirement to mount one or more accessories, such as automated meter reading devices or devices for generating pulses, on a register cover. The weight of these accessories has required that some register covers have separate structures to support them. Support structures have included a number of longitudinally extending rods attached to the meter at one end of a register cover and extending to contact the distal end of the cover to support accessories on the cover. Such support structures add to the cost of a meter and make it more cumbersome to assemble and maintain.

SUMMARY OF INVENTION

A temperature compensated rotary fluid meter for measuring the volume of a fluid flowing through it includes a meter housing which has a pressurized chamber in which fluid flows. A meter impeller assembly extends into the pressurized chamber so that one or more impellers rotate in response to the flow of fluid through the meter.

A temperature transducer has temperature sensing components, including a sensing bulb and a bellows, mounted substantially fully within the fluid flow chamber. The sensing bulb contains a liquid which expands and contracts with temperature changes and includes a bellows having an outside surface in contact with the liquid to react to liquid forces exerted due to expansion or contraction and having a moveable end in contact with the liquid and a stationary end. An actuator rod is attached to the moveable end of the bellows and moves substantially linearly and substantially continuously and proportional to theoretical temperature adjustment in a first direction as the bellows contracts when the liquid expands with an increase in the temperature of the fluid and moves respectively in a second direction as the bellows extends when the liquid contracts with a decrease in the temperature of the fluid.

The fluid meter also includes a transmission assembly and a register assembly which has at least a temperature compensated index for recording a volume of fluid flowing through the meter which is compensated for changes in the temperature of the fluid. The transmission assembly also includes a number of components which cause the temperature compensated index to adjust its measurement substantially linearly and substantially continuously for a particular volume of fluid in response to temperature changes.

These components include a cylinder having a cylindrical surface and a cylinder shaft which is radially stationary with the cylinder, while rotating in a mounting assembly at both of its ends The transmission assembly further includes a cone which has a conical surface and a cone shaft, radially stationary with the cone while rotating in a mounting assembly at both of its ends. The cylinder shaft and the cone shaft are in the same plane with one another and are located at an angle with respect to one another so that adjacent portions of the cylindrical surface and the conical surface are parallel to each other. A spring is in contact with said cone and has a spring force to bias the cone toward the cylinder. The cylinder shaft is operatively coupled to the impeller to cause the cylinder to rotate as the impeller rotates, while the cone shaft is connected to the temperature compensated register.

The transmission assembly also includes transfer ring which has a ring height and encircles the cylinder in driving contact with the cylindrical surface and the conical surface due at least in part to the spring force on the cone to cause the cone to rotate in response to the rotation of the cylinder. A transfer mechanism is interconnected with the transfer ring to move the transfer ring in a direction parallel to the axis of rotation of the cylinder. The actuator rod is interconnected with the transfer mechanism to cause the transfer mechanism to change the position of the transfer ring along the axis of the cylinder in response to changes in the temperature of the fluid being measured, thereby changing the speed of rotation of the cone with respect to the cylinder for a particular volume of fluid as the temperature of the fluid changes.

In one embodiment of this invention, the mounting assembly for the cylinder shaft includes a pair of elastomeric expanders within it, each of which extends circumferentially as a component of the mounting assembly. Additionally, the cone is slidably mounted on the cone shaft, and a spring is in contact with the cone to bias the cone on the cone shaft towards the cylinder.

The cone and the cylinder are mounted at positions such that said conical surface and said cylindrical surface are at a preselected distance from one another which is less than the transfer ring height during the rotation of the cone when the cone reaches the limit of its travel on the cone shaft. Thus, a traction force is exerted on the portion of the transfer ring that is between the conical surface and the cylindrical surface. The traction force cause the elastomeric expanders in the mounting assembly for the cylinder shaft to flex, in response to this force, by a predetermined amount that results in minimizing the effects of discontinuities in the size and shape of the ring, the cylinder and/or the cone during their rotation.

In accordance with another aspect of this invention, the fluid meter includes a register cover comprising an elongated housing, made of plastic material, that has a rounded cross section, a length, a meter end connectable to the meter and a closed end in which an opening may be made if accessories are to be connected. The register cover includes a mounting flange on its meter end, while its closed end is constructed out of plastic material. The mounting flange has a plurality of mounting holes in it for receiving mounting bolts used to connect the register cover to the meter housing. The register cover further includes at least one side rib, which is molded onto the outside of the housing and extends from a location adjacent each of the plurality of mounting holes substantially along the length of the housing. In one embodiment of this invention the at least one side rib comprises a pair of ribs, one mounted on each side of each mounting hole. A radially extending closure rib, corresponding to each of the at least one side ribs, is located within the register cover, on the closed end and begins near the end of each of the at least one side ribs to which it corresponds and extends toward the center of the closed end. In one embodiment of this invention, the closure ribs terminate at a circular flange on the closure.

This invention does not reside in any one of the features of the temperature compensated rotary meter disclosed above and in the Description of the Preferred Embodiments and claimed below. Rather this invention is distinguished from the prior art by its particular combination of features of a temperature compensated rotary meter. Important features of this invention have been disclosed in the Detailed Description of the Preferred Embodiments of this invention. These are shown and described below to illustrate the best mode contemplated to date of carrying out this invention.

Those skilled in the art will realize that this invention is capable of embodiments which are different from those shown and the details of the structure of the temperature compensated rotary meter can be changed in various ways without departing from the scope of this invention. Accordingly, the drawings and description are to be regarded as illustrative in nature and are not restricting the scope of this invention. Thus, the claims are to be regarded as included such equivalent meters as do not depart from the spirit and scope of this invention.

BRIEF DESCRIPTION OF DRAWINGS

For a more complete understanding and appreciation of this invention and its many advantages, reference will be made to the following, detailed description of this invention taken in conjunction with the accompanying drawings in which:

FIG. 8 is a top view of a transfer mechanism for the transfer ring, including a temperature indicator, with a bellows shown in cross section;

FIG. 11 is a perspective side view of one side of a partially assembled transmission assembly showing the type of transfer mechanism for the transfer ring which is shown in FIG. 7;

FIG. 11A is a perspective view of a rod holder of the transfer mechanism of FIG. 11;

FIG. 12 is a perspective bottom view of a partially assembled transmission assembly with the type of transfer mechanism shown in FIG. 11;

FIG. 15 is a cross sectional view of a register cover having a right angle drive assembly attached to it and connected with a temperature compensated accessory output shown without the transmission with which it is interacting;

FIG. 16 is a cross sectional view of a register cover having an accessory connected to it and connected with a temperature compensated output shown without the transmission with which it is interacting;

DETAILED DESCRIPTION

Figure 1:
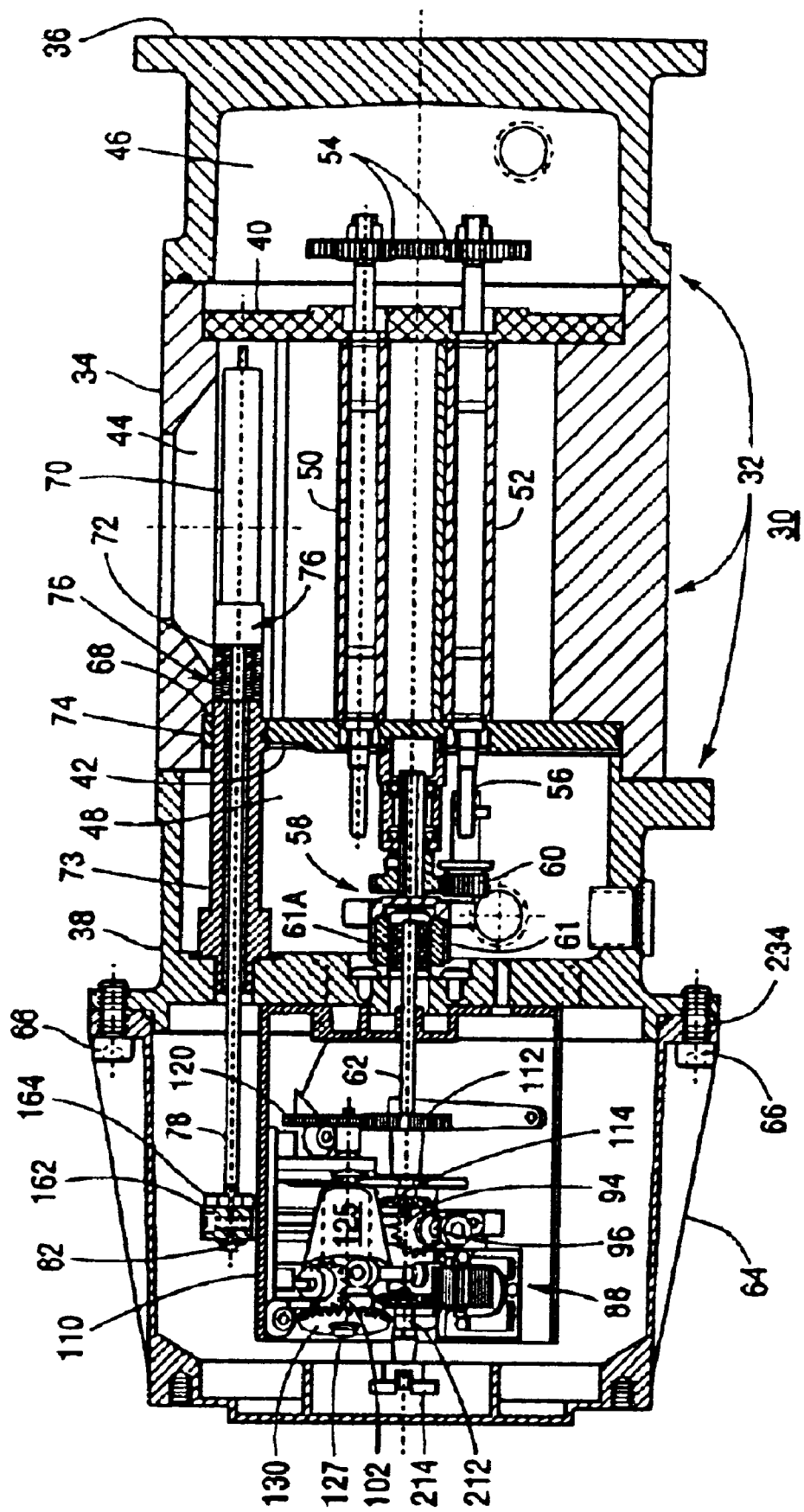
FIG. 1 is a cross sectional side view of a temperature compensated rotary meter according to this invention.

Referring to the drawings, identical reference numerals designate the same or corresponding parts throughout the several figures shown.

A rotary meter 30 shown in FIG. 1 comprises a housing 32 which includes a fluid chamber casing 34, a gear end cover 36 and a driver side end cover 38. An end bearing plate 40 and a driver side bearing plate 42 divide the housing 32 into a dynamic fluid flow chamber 44, having a statically pressurized end chamber 46 on one end, and another statically pressurized chamber 48 on the other. The fluid flow chamber 44, end chamber 46 and the end chamber 48 are all equally pressurized when the meter 32 is placed in line with a fluid transmission line so as to measure the volume of fluid passing through the line.

This invention can be used with any rotary fluid flow meter that may be desired. By way of example only, this invention can be used with a rotary meter shown in U.S. Pat. No. 5,970,791 filed on Apr. 28, 1998, issued Oct. 26, 1999 and assigned to the assignee of this invention. While it is contemplated that this invention will be useful for meters that measure the flow of any of a number of fluids, it is particularly useful for meters that measure the flow of gas as shown in the illustrated embodiments. A meter with which this invention is used may have one or more than one impeller rotated by fluid flowing through the meter so as to measure the volume of fluid flow. The rotary meter shown in FIG. 1 includes a pair of impellers 50 and 52 mounted within the fluid flow chamber 44. The impellers 50 and 52 are mounted on bearings located in the end bearing plate 40 and in the bearing plate 42 and are interconnected by a set of gears 54 located within the end chamber 46. An impeller shaft 56 extends into the driver side end chamber 48 and is coupled to a center drive 58 through a set of gears 60. The output rotation of the impellers 50 and 52 is then connected through a magnetic coupler 61 within the center drive coupling to an output shaft 62 located within a register cover 64 which is attached to the center drive chamber housing 38 by a plurality of bolts 66. While any number of bolts can be used to attach the register cover 64 to the center housing 38, four bolts are used in the preferred embodiment of this invention, each spaced 90° apart from the bolts adjacent it.

A temperature transducer 68 is mounted in the housing 32 and has temperature sensing components, including a sensing bulb 70 and a bellows 72, located totally within the fluid flow chamber 44. The temperature transducer 68 is retained physically in a hole in the bearing plate 42 and within a hole in an end portion 74 of the fluid flow casing 34. The sensing bulb 70 contains a liquid which expands and contracts with temperature changes of the fluid that flows through the fluid flow chamber 44. The bellows 72 is constructed so as to have its outside surface, and not it's inside surface, in contact with the expansion liquid directly communicating with the same expansion liquid within the sensing bulb 70. The liquid itself flows freely between the sensing bulb 70 and a bellows chamber 76 in which the bellows 72 is mounted. The bellows 72 is constructed in such a manner that it reacts with a substantially linear and substantially continuous motion proportional to volume changes of the expansion liquid within the sensing bulb 70 and the bellows chamber 76 without the need for an additional spring. In one embodiment of this invention, the bellows 72 within the temperature transducer 68 is a welded diaphragm bellows that has a spring constant, one example of which is manufactured by Flexial Corporation of Cookeville, Tenn. The use of a formed bellows is possible but requires a spring loading and a larger geometry.

One end of the bellows 72 which extends into the fluid flow chamber 44 is attached to an end of an adapter 73. The other end of the bellows 72 is movable and is attached to an actuator rod 78 which extends through the adapter 73 and into the register cover 64. The movable end of the bellows 72 moves linearly back and forth within the bellows chamber 76 as the bellows expands and contracts, as long as the bellows 72 and the sensing bulb 70 are both located substantially fully within the fluid flow chamber 44 as shown in FIG. 1. The bellows 72 contracts when the liquid within the sensing bulb 70 and the liquid portion in bellows chamber 76 expands substantially linearly and substantially continuously with an increase in the temperature of the fluid flowing through the fluid flow chamber 44 thereby moving the actuator rod 78 further into the register cover 64. The actuator rod 78 is moved substantially linearly and substantially continuously away from the register cover 64 as the bellows expands when the liquid contracts as the temperature of the fluid in the sensing bulb 70 and around the bellows 72 and chamber 76 decreases.

Figure 2A:
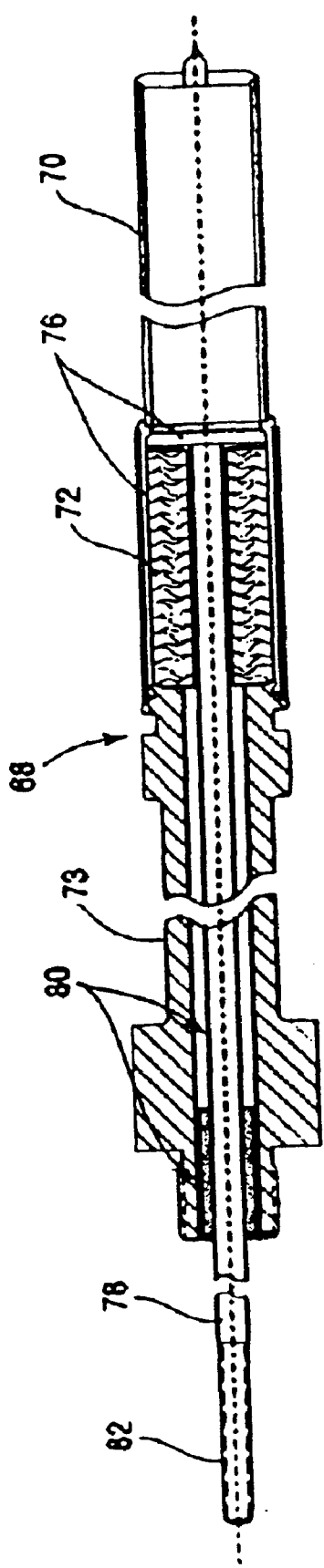
FIG. 2A is a cross sectional view of a temperature transducer with a bellows expanded.
Figure 2B:
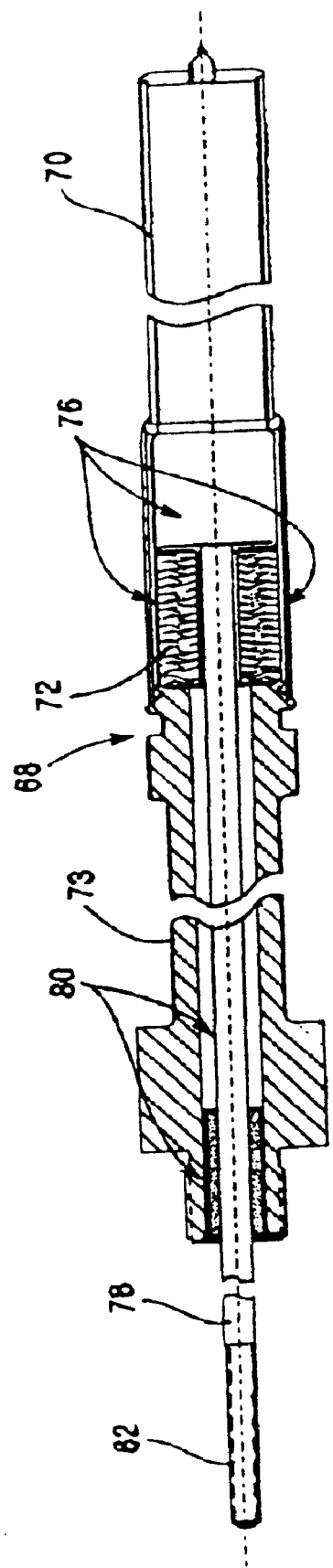
FIG. 2B is a cross sectional view of a temperature transducer with a bellows contracted.

The temperature transducer 68 is shown in larger scale in FIGS. 2A and 2B. As indicated above, the welded bellows 72 react with a liner motion proportional to volume changes of the expansion liquid within sensing bulb 70 and bellows chambers 76 without the need to use a spring for this purpose. The temperature responding liquid contacts or expands the bellows 72 as a function of volume displacement relative to effective diametrical area of the bellows. There is air on the inside of the bellows. Air is sucked into the bellows, as it expands, through a passage 80 in the adapter 73, and the actuator rod 78 extends further into the register cover 64 (shown in FIG. 1). The air is expelled through the passage 80 as the bellows contracts, and the actuator end retracts from the register cover 64. The actuator rod 78 has a set of screw threads 82 machined onto its end that extends into the register cover 64.

Figure 3:
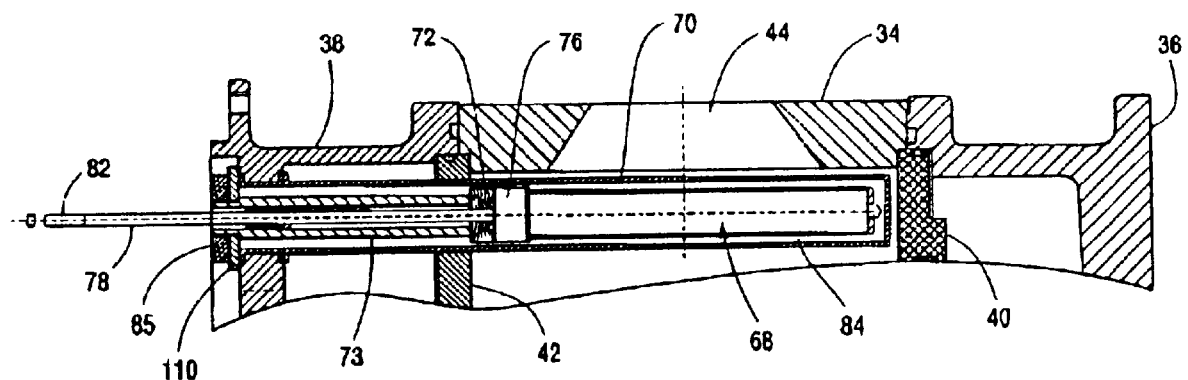
FIG. 3 is a cross sectional view of a temperature transducer having a protective casing mounted within a rotary meter.

Another embodiment of this invention is shown in FIG. 3 in which the temperature transducer 68 includes a transducer casing 84 that encloses the transducer 68. The transducer casing 84 is used in jurisdictions that require additional protection for components of the temperature transducer, such as the sensing bulb 70, or for applications that are exposed in certain circumstances to some possibility of damage during the course of their use. This embodiment also provides the ability to remove the entire transmission assembly 78 and the register mechanism, as well as the transducer, without depressurizing the meter. However, in accordance with one aspect of this invention, both the sensing bulb 70 and the bellows 72 are substantially fully located within the fluid flow chamber 44. The location of both the sensing bulb 70 and the bellows 72 substantially fully in the fluid chamber 44 assures a linear response of the temperature transducer 68 to temperature changes. The transducer in this configuration is mounted stationary with a transmission frame 110 by means of a clamping nut 85. Upon removing the nut 85, the transducer 68 can be removed from the meter 30 together with the case cover 38 and attached transmission register assembly, without either depressurizing the meter 30 or recalibrating the transmission.

Figure 4:
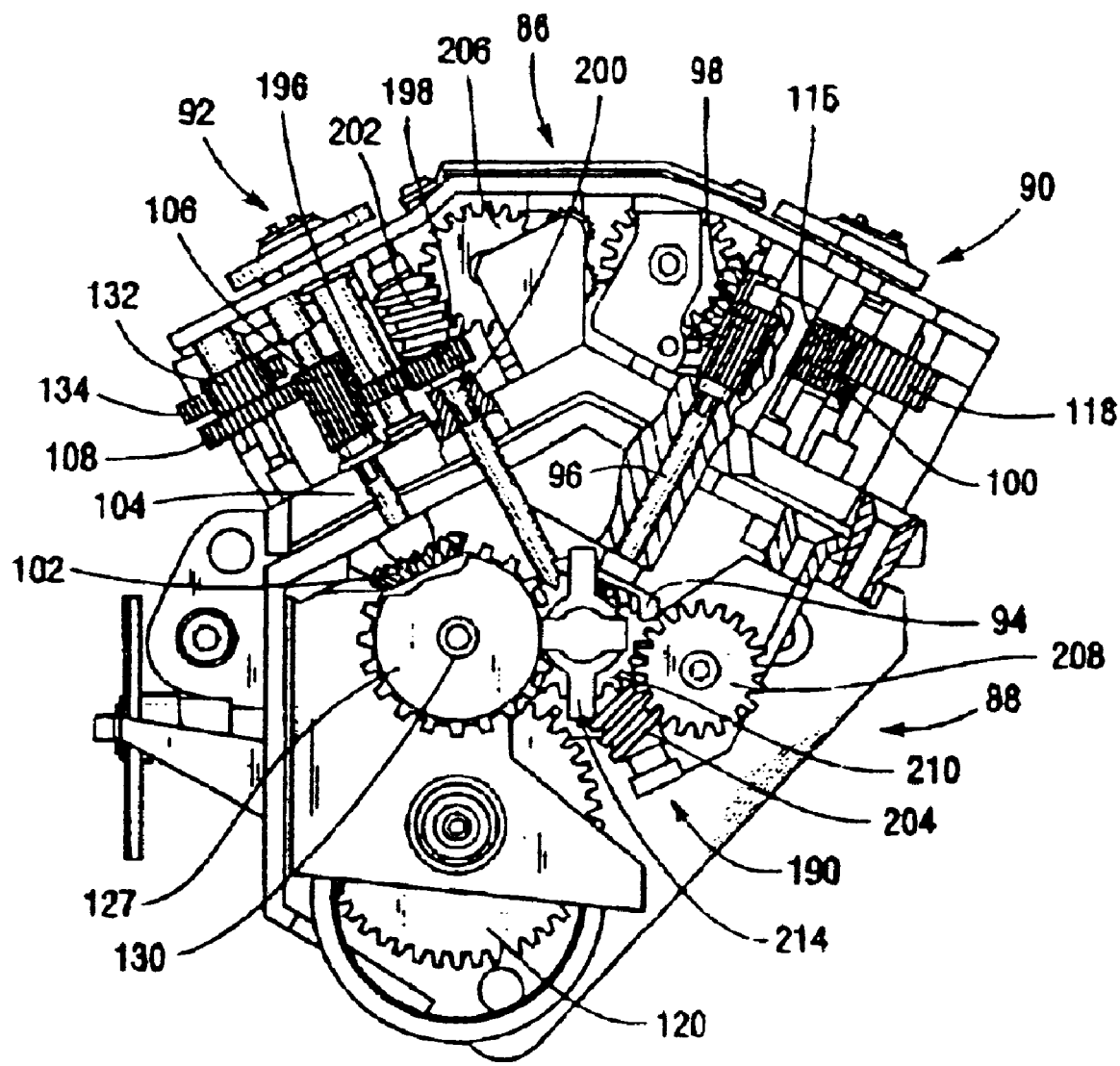
FIG. 4 is a front view, partially cut away, of the transmission assembly, and combination register assembly shown in FIG. 1.
Figure 17:
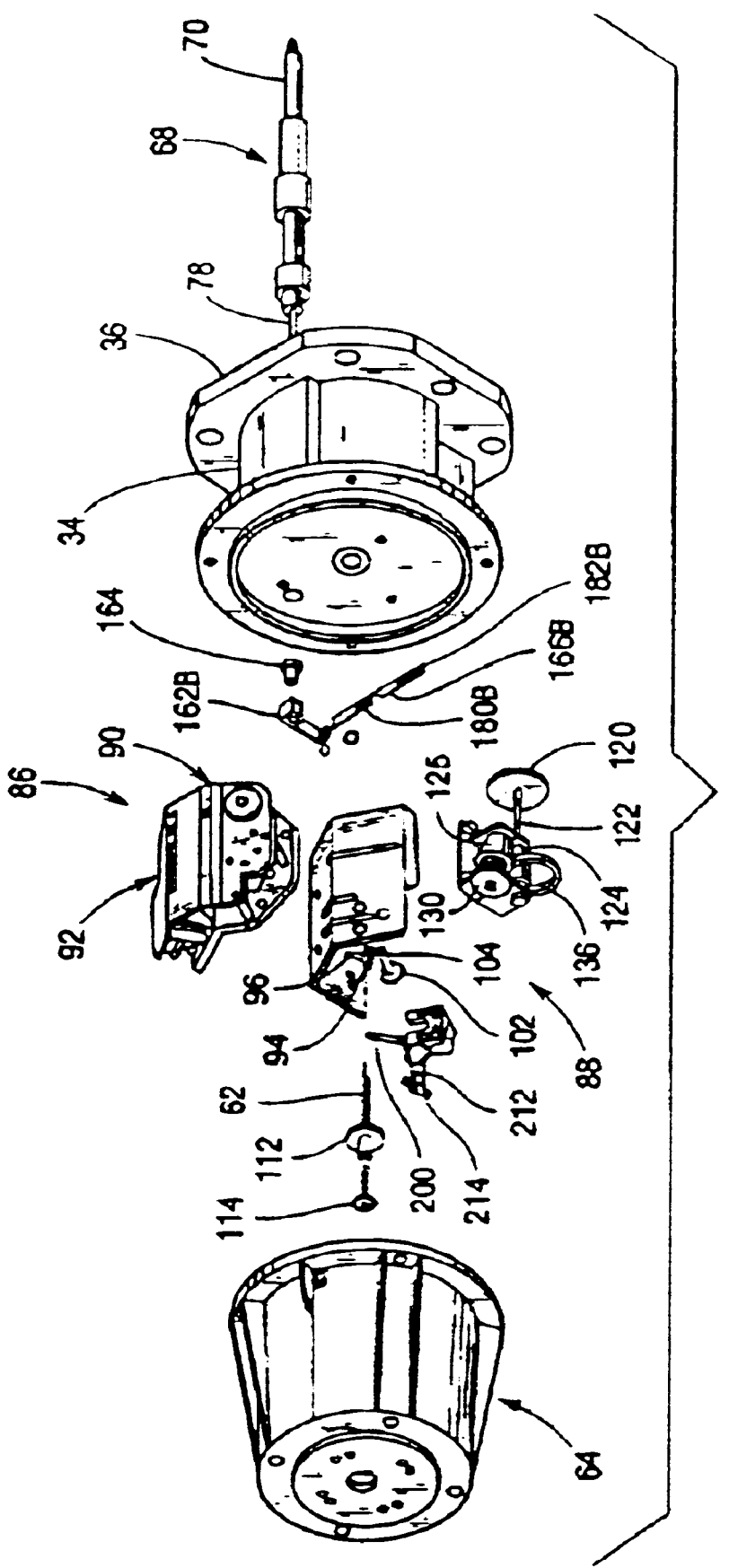
FIG. 17 is an exploded view of the temperature compensated rotary meter shown in FIG.1 without showing the measurement section of the meter and opposite case cover assembly.

Referring once again to FIG. 1, along with FIG. 4, the temperature compensated rotary meter 30 further includes a register assembly 86 (shown only in FIG. 4 as well as in FIG. 17) and a transmission assembly 88. The register assembly 86 is on the other side of the transmission assembly 88 in the view shown in FIG. 1. Suffice it to say that, referring to FIG. 4, the register assembly 86 includes an uncompensated index 90 and a temperature compensated index 92. The transmission assembly 88 is coupled to the uncompensated index 90 through an uncompensated bevel gear 94 and a shaft 96 having one end fastened to the uncompensated bevel gear 94 and the other end coupled to a shaft of gear 98 which meshes with a gear 100 within the uncompensated index 90 by means of a coupling. The transmission assembly 88 is interconnected with the compensated index 92 through a bevel gear 102, fastened to one end of a shaft 104 that has its other end attached to a shaft of gear 106 which meshes with a gear 108 within the compensated index 92 by means of a coupling representing the input to the compensated index.

Figure 5:
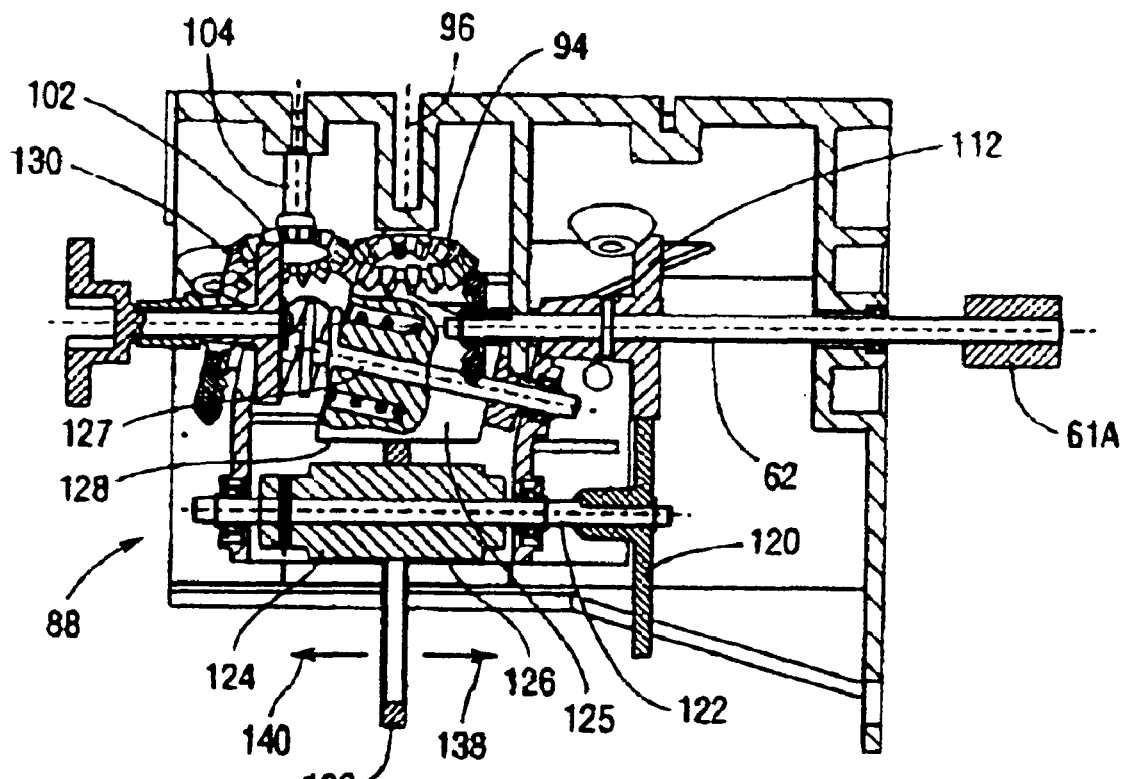
FIG. 5 is a cross sectional side view of the transmission assembly shown in FIG. 4, without a transfer mechanism for its transfer ring.
Figure 6:
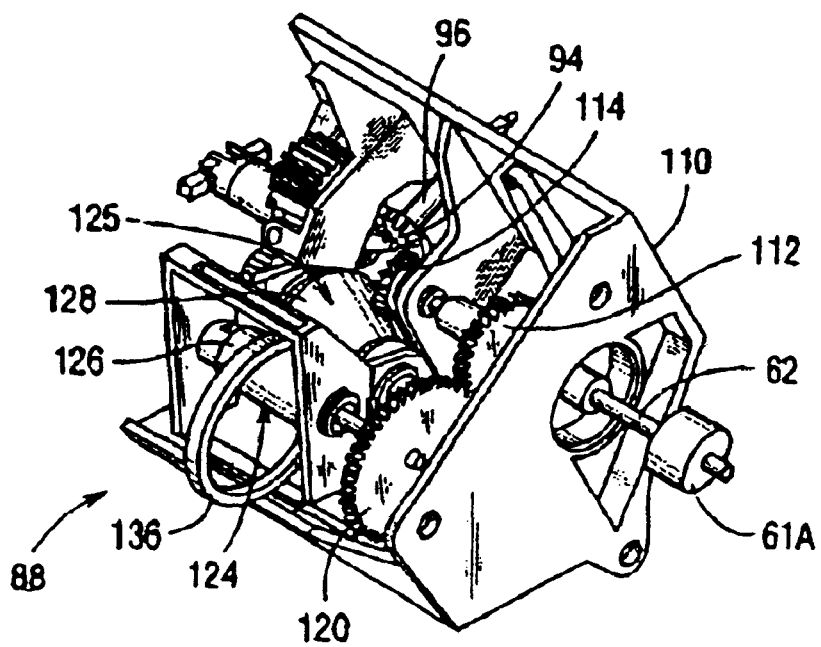
FIG. 6 is a perspective view of the transmission assembly shown in FIG. 4.

Referring now to FIGS. 5 and 6, the transmission assembly 88 is mounted on and within a transmission frame 110 which may be molded out of plastic or formed out of other material that is convenient for retaining the various components of the transmission assembly 88. An innermagnet 61A is a portion of the magnetic assembly 61 that couples the rotation of the impellers 50 and 52 (shown in FIG. 1) through gear pair 60 to the output shaft 62 to an input spur gear 112 and a bevel gear 114, both of which are attached to it. The uncompensated bevel gear 114 meshes with the bevel gear 94 so as to rotate the shaft 96 that features a coupling, thus rotating the gear 98 within the uncompensated register 90 as shown in FIG. The rotation of gear 98 rotates the gear 100 within the uncompensated register 90, causing gear 116, which rotates on the same shaft with gear 100, causing the gear 116 to rotate a gear 118 which meshes with it. The gears 100, 116 and 118 are three of a series of gears arranged sequentially to convert the uncompensated rotation center drive driven by one impeller or uncompensated rotation of impellers of a meter to an appropriate output reading of the uncompensated index 90.

Referring once again to FIGS. 5 and 6, the input spur gear 112 meshes with a cylinder spur gear 120 mounted on a cylinder shaft 122 which comprises the axis of rotation of a cylinder 124 which is mounted on it. The cylinder 124 has a cylindrical outer surface 126.

The transmission 88 further includes a cone 125 mounted on a cone shaft 127, which defines the axis of rotation of the cone, and has a conical surface 128. The cylinder shaft 122 and the cone shaft 127 are located in the same plane with one another and are arranged at an angle with respect to one another in that plane so that adjacent portions of the cylindrical surface 126 and the conical surface 128 are parallel to one another. The end of the cone shaft 127 which is adjacent the largest diameter of the cone is attached to a bevel gear 130 which meshes with the compensated bevel gear 102 and through the shaft 104 by means of a coupling turns the gear 106 within the compensated register 92, as more fully shown in FIG. 4. The gear 106 meshes with the gear 108 and turns a gear 132 which is mounted on the same shaft, causing the gear 132 to rotate a gear 134 within the compensated index 92. The gears 108, 132 and 134 are three of a series of intermeshing gears which cause the compensated index to record and provide a readout of the volume of fluid flowing through the meter, compensated for temperature changes of the fluid itself with respect to a selected base temperature. It is the rotation of the cone 125, which is seen in FIGS. 5 and 6, that causes the compensated register 92 to record and display the temperature compensated volume of fluid flow.

The transmission assembly 88 further includes a transfer ring 136 which encircles the cylinder 124 and is mounted between the cylinder 124 and the cone 125 so as to be in driving contact between the cylindrical surface 126 and the conical surface 128. As will be explained more fully below, this driving contact occurs at least in part because the spring force of a spring 158 biases the cone 125 toward the cylinder 124 and the space between the cylindrical surface 126 and the conical surface 128 is slightly smaller than the cross section of the transfer ring 136, causing these surfaces 126 and 128 to exert a traction force on the transfer ring 136. Because the transfer ring is in driving contact between the cylindrical surface 126 and the conical surface 128, the transfer ring 136 transfers rotation of the cylinder 124 to the cone 125. A transfer mechanism, which is not shown in FIGS. 5 and 6, is interconnected with the transfer ring 136 to move the transfer ring to the right in FIG. 5, as shown by arrow 138, and to the left, as shown by arrow 140. Both directions are in parallel to the cylindrical shaft 122 and thus in parallel with the axis of rotation of the cylinder 124. As the transfer ring 136 is moved to the right, in the direction of arrow 138, the transfer ring 136 contacts portions of the cone having decreasingly smaller diameters and thus having a decreasingly smaller circumference. The result is a more rapid rotation of the cone, since a smaller arc of the ring 136 has to contact the surface of the smaller circumference of the cone 125 to cause each full 360 degree rotation of the cone 125. The ring 136 is appropriately moved to the right, in the direction of arrow 138, to increase the speed of rotation of the cone 125 as the temperature of the fluid being measured decreases, thereby compensating for increased density of the fluid, and thus, increased energy per unit of volume of the fluid.

The opposite is true as the transfer ring is moved to the left in FIG. 5, in the direction of the arrow 140. The diameter of the cone 125 increases in this direction, increasing the circumference of the cone. Thus, a larger portion of the arc of the ring 136 must contact the surface 128 of the cone 125 to cause the cone 125 to rotate one 360 degree revolution, thereby decreasing the speed of rotation of the cone 125. The ring 136 is appropriately moved to the left, in the direction of the arrow 140, as the temperature of the fluid being measured increases, thereby compensating for decreased density of this fluid, and thus, decreased amount of energy within a unit of volume of the fluid. The temperature compensated index 92, shown in FIG. 4 as well as FIG. 17, registers a lower volume per revolution of the cone 125 as the ring 136 is moved to the left, as shown in FIG. 5.

Figure 7A:
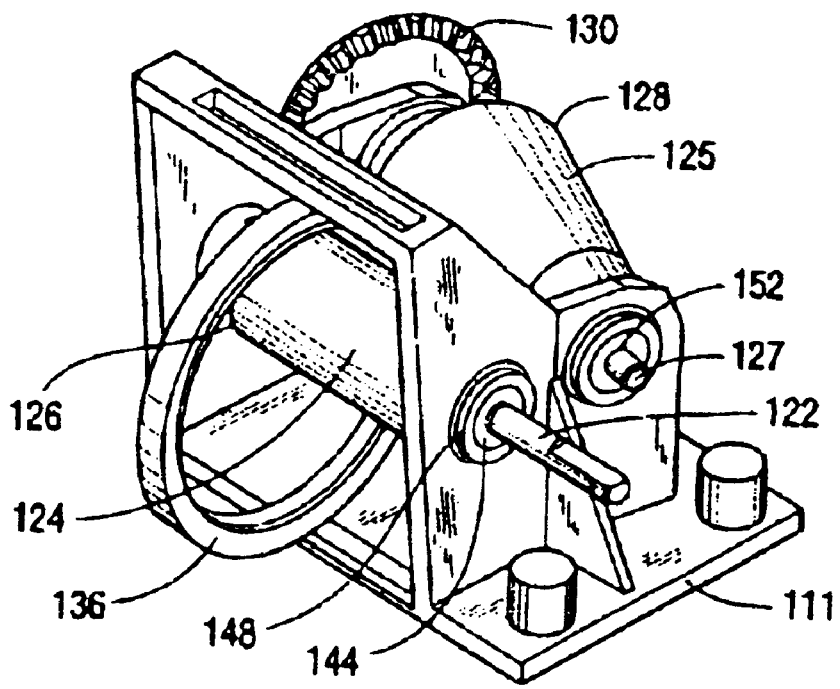
FIG. 7A is a perspective view of the partially assembled cylinder, cone and ring portion of the transmission assembly shown in FIG. 5.
Figure 7B:
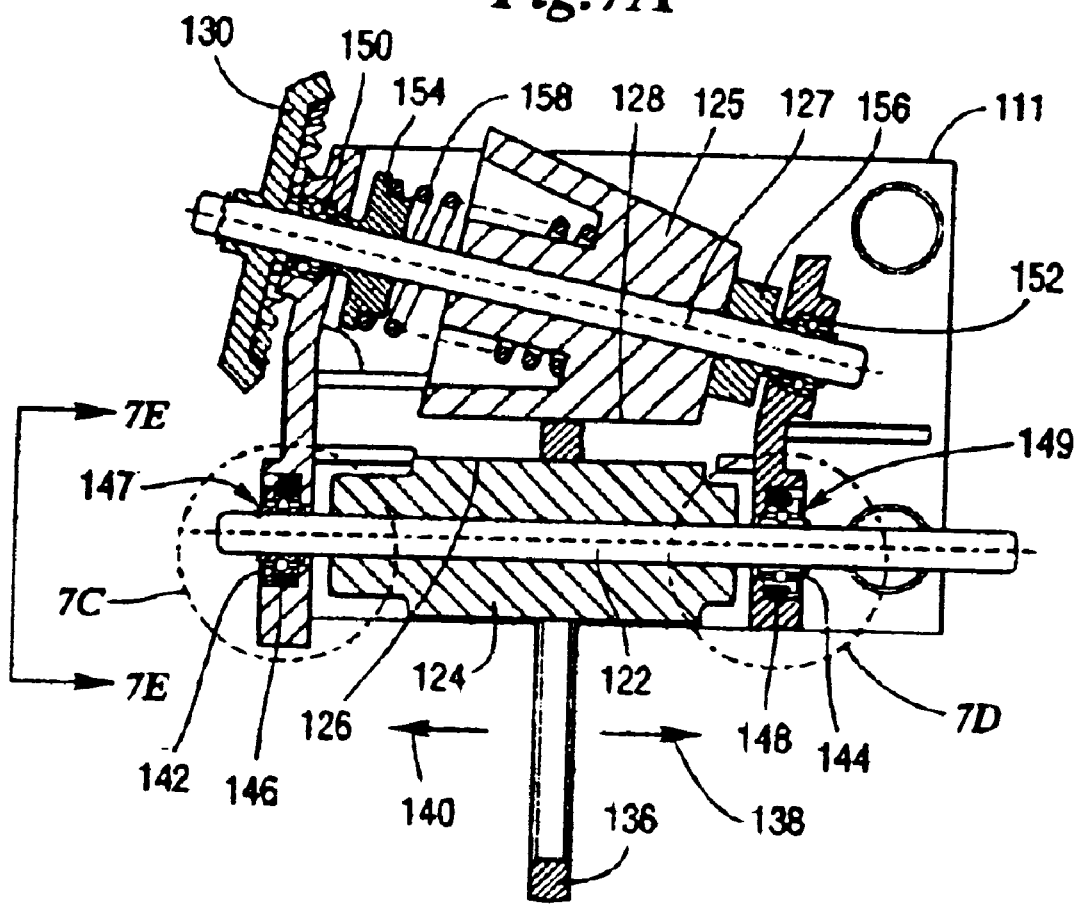
FIG. 7B is a cross sectional view of the cylinder, cone and ring assembly of FIG. 7A, showing a cone bearing spring and a pair of elastomeric seals in a cylinder shaft mounting assembly.
Figure 7D:
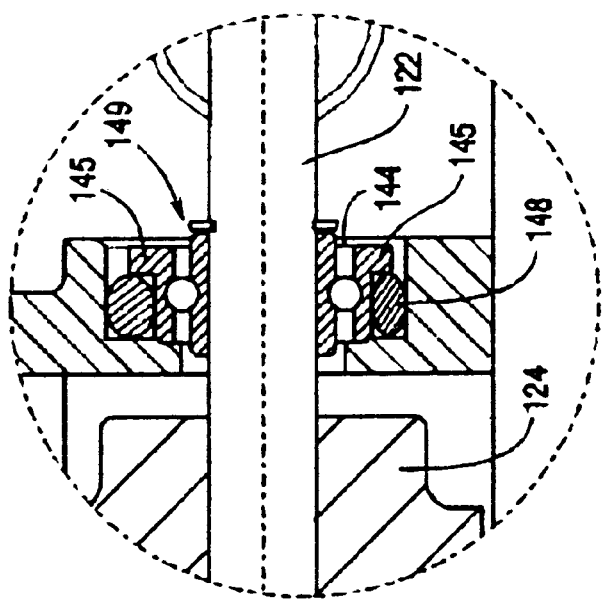
FIG. 7D is an enlarged view of the mounting assembly of the right side of the cylinder shaft shown in FIG. 7B.
Figure 7E:
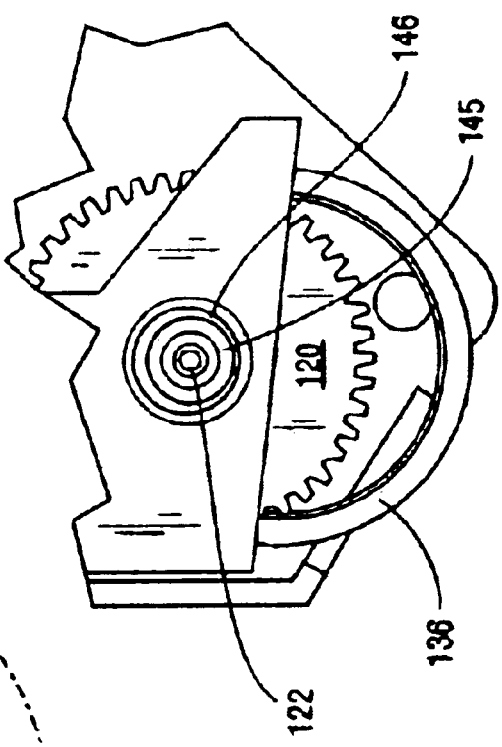
FIG. 7E is a front view of the mounting assembly of the cylinder shaft shown in FIG. 7B.
Figure 7C:
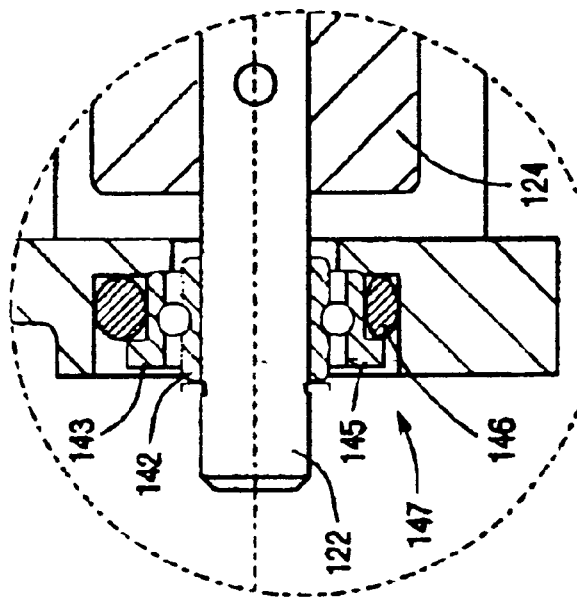
FIG. 7C is an enlarged view of the mounting assembly of the left side of the cylinder shaft shown in FIG. 7B.

A partially assembled transmission assembly is shown in FIGS. 7A and 7B to illustrate the manner in which the cylinder 124 and the cone 125 are mounted on a bearing holder 111 to provide traction between each of them and the transfer ring 136. The cylinder shaft 122 is mounted between a pair of ball bearings 142 and 144 which are shown as flanged ball bearings. Elastomeric expanders 146 and 148 extend around the ball bearings 142 and 144, respectively, within the mounting assembly of the cylinder shaft, and thus extend around the cylinder shaft itself. The elastomeric expanders 1 46 and 148 are retained on their respective ball bearings by flanges 143 and 145 located on the outer races of the ball bearings 142 and 144, respectively, as shown in FIGS. 7C and 7D. By way of example only, in one meter transmission assembly incorporating this invention, the elastomeric expanders 146 and 148 were #10 size o-rings. However, other types and sizes of o-rings, quarto or square rings, and spring energized seals are examples of other elastomeric expanders that could be used in accordance with this invention.

As seen in FIG. 7B, the cone 125 is slidably mounted on the cone shaft 127 but radially locked or keyed to this shaft. The cone shaft 127 is mounted between a pair of mounting assemblies 147 and 149 which include a pair of ball bearings 150 and 152, respectively. A spring washer 154 is located on the upper side of the cone shaft 127, adjacent the ball bearing 150. A spacer 156 is located at the other, lower end of the shaft 127, adjacent the ball bearing 152. A spring 158 is mounted between the spring washer 154 and the cone 125 so as to exert a force on the cone down the shaft 127 toward the spacer 156 and thus bias the conical surface 128 toward the cylinder 124.

Referring specifically to FIG. 7B, the transfer ring 136 is mounted between the cylinder 124 and the cone 125 by placing it so that the cylinder 124 is arranged inside of it when mounting the cylinder between the mounting assemblies 147 and 149 in the transmission assembly. Then the cone 125 is assembled by inserting the cone shaft first followed by spring spacer 154, spring 158, cone 125, cone spacer 156 and retaining rings. The cone 125 is moved to the left, in an upward direction on the cone shaft 127, against the force of the spring 158 to provide sufficient ring clearance. As indicated above, the angle at which the cone shaft 127 is mounted within the transmission assembly causes the portion of the conical surface 128 closest to the cylindrical surface 126 to be parallel to it. With the cone forced to the left in FIG. 7B against the force of the spring 158, there is a space between the cylindrical surface 126 and the conical surface 128 which is larger than the cross section of the transfer ring 136. Thus, the transfer ring 136 can be moved to a position along the axis of the cone 124 such that the conical surface 128 contacts the outer circumferential surface of the transfer ring 136 and the cylindrical surface 126 contacts the inner circumferential surface of the transfer ring 136.

The cone 125 and the cylinder 124 are mounted at positions such that the conical surface 128 and the cylindrical surface 126 are at a preselected distance from one another, which is less than the height of the transfer ring 136, when the smaller end of the cone 125 is at the limit of the distance the cone 125 can travel on the cone shaft 127. In the illustrated embodiment of this invention, the cone 125 contacts the spacer 156. The radial travel required to accept the transfer ring cross section is provided by elastomeric expanders 146 and 148 in cylinder shaft bearing assemblies 147 and 149, FIGS. 7A, 7B. As a result, as the spring force of the spring 158 biases the cone 124 toward the cylinder 124 and thus toward the spacer 156, a traction force is exerted, at least in part by the spring force, on the portion of the transfer ring 136 which is between the cylindrical surface 126 and the conical surface 128. This traction force continues during the rotation of the cone 125. It is contemplated that the preselected distance between the conical surface 128 and the cylindrical surface 126 can be achieved by using the separate spacer 156, as described and shown, using a spacer which is attached to a part of the end of the cone 125 by having a cone with a precise length or by any other convenient means or method.

Referring in particular to FIGS. 7C and 7D, along with FIG. 7B, this traction force causes the elastomeric expanders 146 and 148 to flex at the bottom of the mounting assemblies 147 and 149 by a predetermined amount that results in minimizing the effects of discontinuities of the dimensions of the ring 136, the cylinder 124, and the cone 125 during their rotation. That is, the elastomeric expanders are to be normally flexed by an amount which (a) allows them to flex further if an increase in the dimensions of the transfer ring 136, the cylinder 124 and/or the cone 125 increases the force on the transfer ring 136, and thus the downward force on the expanders 146 and 148, and (b) also allows them to expand sufficiently if a decrease in the dimensions of the transfer ring 136, the cylinder 124 and/or the cone 125 decreases the force on the transfer ring 136 and thus, the downward force on the expanders 146 and 148. As a result, the cylinder 124, the cone 125 and the transfer ring 136 do not have to be precision machined out of hardened metal and may be more inexpensively manufactured out of other materials such as plastics.

As indicated above, the elastomeric expanders 146 and 148 are caused to flex at least in part by the force of the spring 158 urging the cone 125 toward the spacer 156. However, in one preferred embodiment of this invention, the cone shaft 127 is mounted at an angle which, after the transfer ring 136 is engaged by the cylindrical surface 126 and the conical surface 128, causes the cone 125 to move in a screw-like fashion toward the spacer 156 as the rotation of the cylinder causes the transfer ring 136 to rotate, thereby rotating the cone 125. In this manner the cone 125 works its way down the cone shaft 127 until the cone 125 contacts the spacer 156. This angle of the cone shaft generates a force component of the spring 158 which is normal to the transfer ring. This normal or downward force acting on the ring causes the elastomeric expanders 146 and 148 to flex proportionally. The cone angle is such that the reaction force component of the elastomeric expanders 146 and 148 counter-acting the force of spring 158 is substantially smaller than the force of the spring 158 so that the cone remains in its final position as shown in FIG. 7B. This cone angle must be selected so that the reaction force component of the elastomeric expanders 146 and 148 is smaller than the force of spring 158. In a preferred embodiment of this invention, the cone angle was chosen as a 12° angle. The size, type and spring force of the spring 158 and the size and type of the elastomeric expanders 146 and 148 and amount of force required to flex the elastomeric expanders 146 and 148 a particular distance are also chosen empirically for proper traction of cylinder, ring and cone.

As a result of the use of the combined mounting arrangements of the cylinder 124 and the cone 125, which are described above and claimed below, the effects of discontinuities in the dimensions of the transfer ring 136, the cylinder 124 and the cone are minimized. For this reason, the transfer ring 136, the cylinder 124 and the cone 125 do not have to be as precision machined, as was required of similar components of prior art transmission assemblies. Nor do the transfer ring 136, the cylinder 124 and the cone 125 have to be manufactured from hardened metal so as to maintain precise dimensions with tight tolerances and require higher loading forces for traction. Thus, the transfer ring 136, the cylinder 124 and the cone 125 can be made from non-hardened metal or from plastic materials or other convenient materials.

Referring now to FIG. 8, the transfer ring 136 is moved back and forth along the axis of the cylinder 124 about which it is mounted through the use of a transfer mechanism 160. To enhance the accuracy of the readings of the compensated index 92 (shown in FIG. 4) there should be a substantially linear and substantially continuous response between a change in temperature of the fluid whose volume is being measured by a rotary meter and the change of location of the transfer ring 136 along the axis of the cylinder 124. For that reason, the temperature transducer 68, shown in abbreviated form in FIG. 8, was chosen which has a temperature responsive fluid in its sensing bulb 70 and a type of bellows 72 which responds linearly and continuously to temperature changes when it is placed substantially fully within the fluid flow chamber of the meter. The rod 78 responds linearly and continuously to the movement of the bellows 72. Threads 82 at the end of the rod 78 which is outside the bellows 72 are attached to one end of an adjustment bracket 162 of the transfer mechanism 160 through the use of a split adjustment nut 164 and the clamping feature of the adjustment bracket 162. A yoke 166 is pivoted to the other end of the adjustment bracket 162 and extends around the transfer ring 136 so as to linearly and continuously move the transfer ring 136 upon movement of the bellows 72 as the temperature responsive liquid expands and contracts in the temperature transducer 68.

The rod 78 is also attached to a rack 168 having a plurality of teeth 170 on it which mesh with teeth of a pinion gear 172. The pinion gear 172 is attached with a temperature dial 176 and rotates about shaft 174. A temperature indicator pointer 178 may be installed at an appropriate location on a side of the transmission frame 110 to provide a read-out for the temperature of the fluid passing through the fluid flow chamber of the meter in which a temperature transducer 68 is installed.

FIGS. 9–12 should be reviewed to understand how the transfer mechanism 160 and its components, the adjustment brackets 162A and 162B, the split adjustment nut 164 and the yoke 166, and the temperature dial 176 and pointer 178 are installed with respect to other components of the transmission assembly 88.

Figure 10:
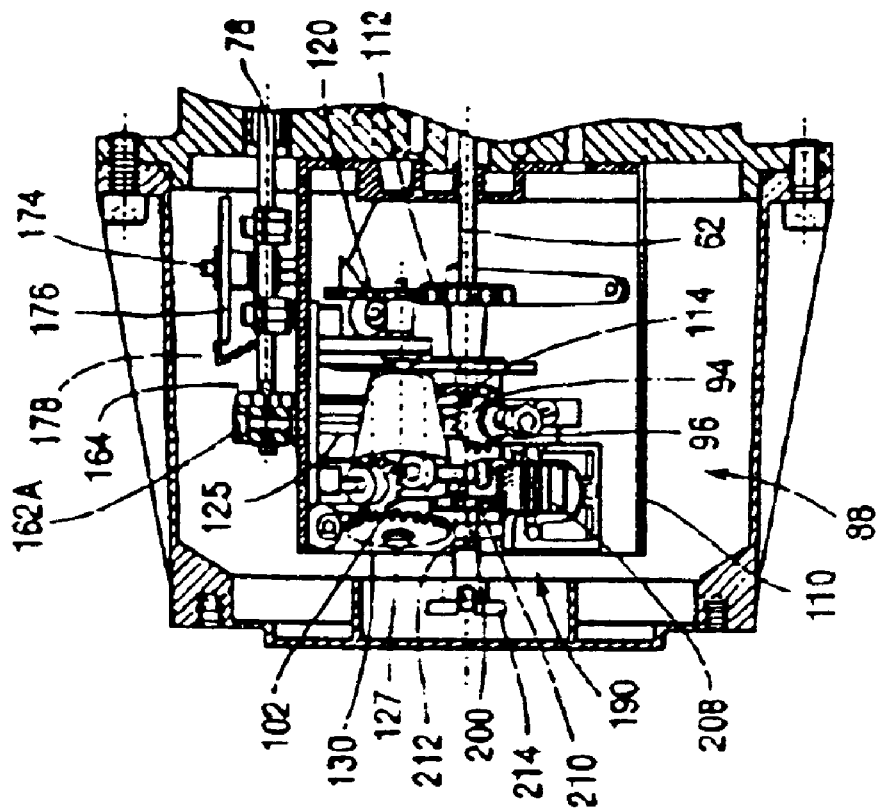
FIG. 10 is a partial cross sectional view of the transmission within a register cover of a rotary meter.
Figure 9:
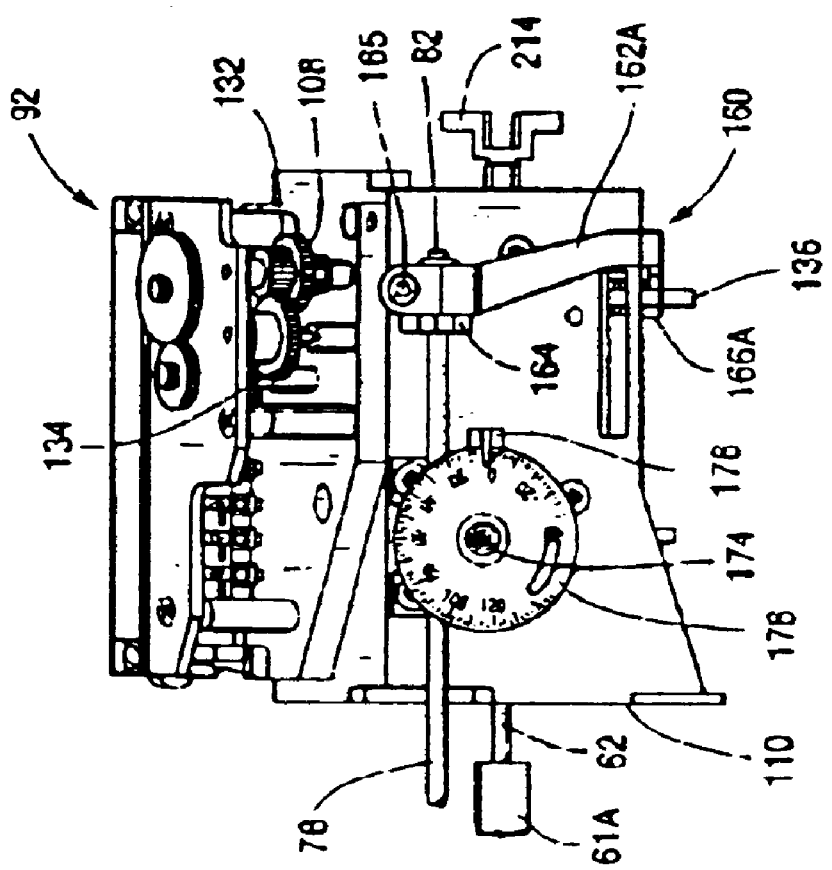
FIG. 9 is a perspective drawing of one side of a transmission and register assembly of the register showing a temperature indicator and a portion of a transfer mechanism for a transfer ring.

FIG. 9 shows the installation of the temperature dial 176 and the transfer mechanism 160, including its components the adjustment bracket 162A, the nut 164, a clamping screw 165 and the yoke 166, on a side of the transmission frame 110 which is adjacent the compensated index 92. This perspective view of the transmission assembly, with a partial view of the register assembly 86, provides yet another orientation of the outside of the transmission frame 110 showing the temperature dial 176 and temperature indicator 178 with the transfer mechanism 160; installed. The top of FIG. 10 depicts the temperature dial 176 installed on the shaft 174 in a view of the transmission assembly 88 that is identical to the view, but with more detail that is a portion of FIG. 1.

FIG. 11A shows, in part, the structure and orientation of the split-adjustment nut 164, which has a threaded, axial hole within it to receive the threads at the end of the rod 78.

The split adjustment nut 164 also has a cylindrical geometry around its outer circumference to enable the outer circumference of the nut 164 to be form fitting into the hole in the adjustment bracket 162A (FIGS. 8–12) or 162B (FIGS. 13 & 14) so that the adjustment bracket 162A or 162B can be prelocated before clamping as the clamping screw 165 is tightened. See also the explosion view of FIG. 17.

The perspective view of FIG. 12 shows a partially assembled transmission assembly 88 at an angle that shows that the yoke 166 has a pair of forks 180A and 182A that extend about the transfer ring 136 approximately 180° apart from one another. It is the fork 180A that is constructed to make contact with the transfer ring 136 so as to move the ring 136 with changes in the temperature of gas flowing through the meter. The fork 182A is somewhat wider than the fork 180A and acts as a stabilizer 180° from the point where the fork 180A contacts the transfer ring 136. See also FIG. 8 Thus, the fork 180A of the yoke 166 contacts the transfer ring 136 and moves this ring 136 axially along the length of the cylinder 124 as the temperature of the fluid being measured changes and the rod 78, attached to the temperature transducer, moves the adjustment bracket 162A to which the yoke 166A is attached. Components of the transmission assembly 88 are also shown in the explosion view of FIG. 17.

Figure 13:
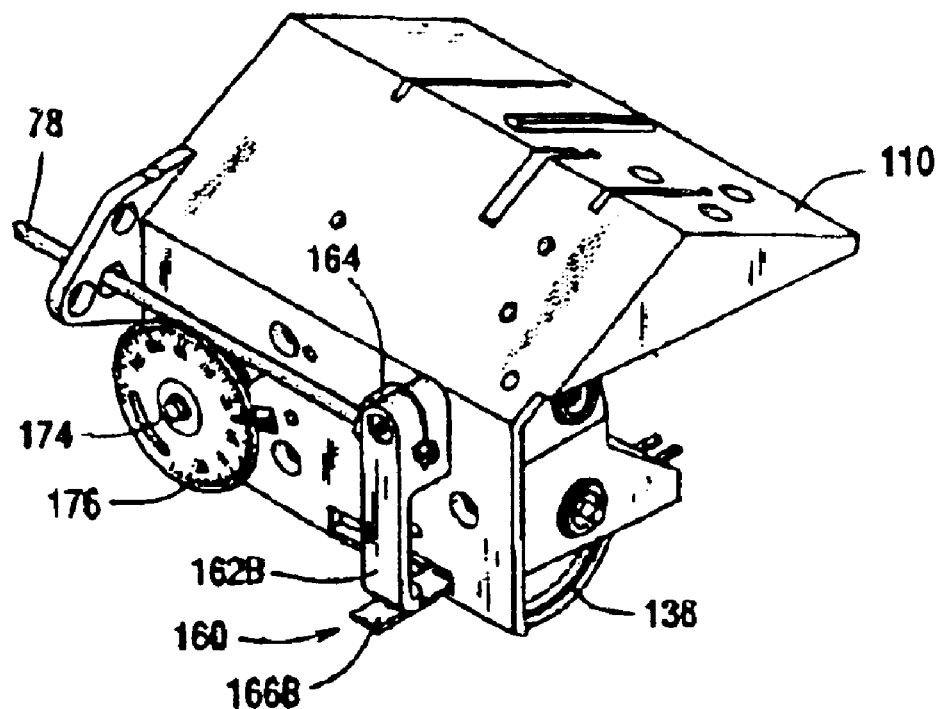
FIG. 13 is a perspective side view of one side of a partially assembled transmission assembly showing another type of transfer mechanism for the transfer ring used for reverse rotational direction.
Figure 14:
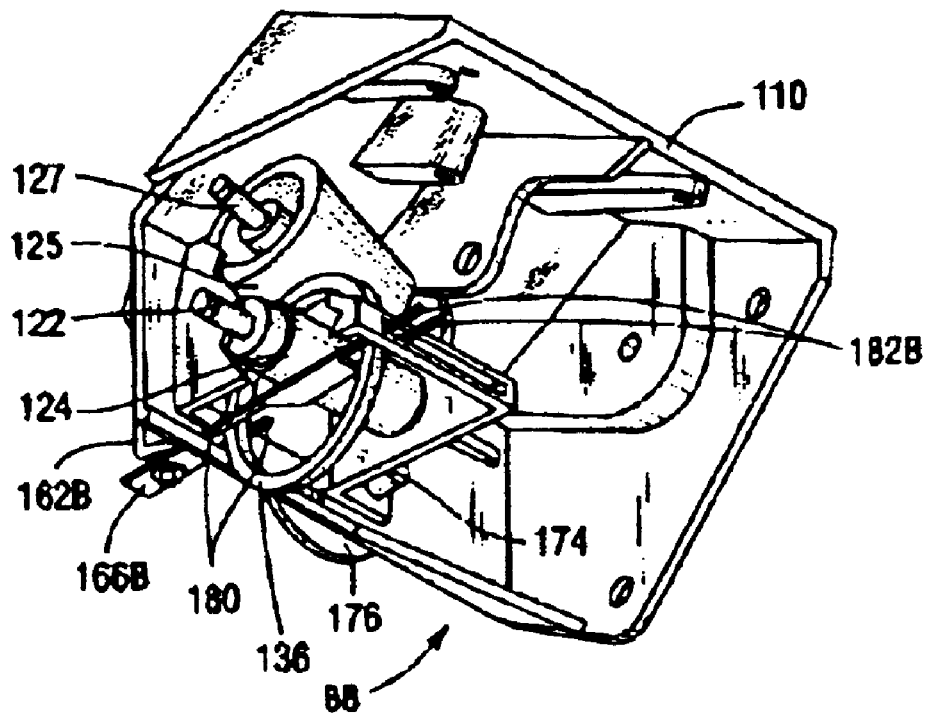
FIG. 14 is a perspective bottom view of the partially assembled transmission assembly with the type of transfer mechanism shown in FIG. 13.

FIGS. 13 and 14 are identical to FIGS. 11 and 12, except that an adjustment bracket 162B and a yoke 166B have been substituted for a bracket 162A and a yoke 166A that were included in FIGS. 11 and 12. In FIGS. 13 and 14 the yoke 166B includes forks 180B and 182B that are installed at 180° from one another with respect to the ring 136. Yoke 166B is identical to yoke 166A, but it is installed in a position which is rotated 180° from yoke 166A. The adjustment bracket 162B and the yoke 166B are used whenever fluid flow through a meter on which the transmission assembly 88 is installed is in the reverse direction for that meter, causing the meter's impellers to revolve in the reverse direction, thereby ultimately reversing the direction of rotation of the cylinder shaft 122, the cylinder 124, and the transfer ring 136.

Many applications of a temperature compensator rotary fluid meter require that the meter provide an output to accessories, which are attached to the register cover 64 of the meter. FIGS. 15 and 16 are simplified representations of the register cover 64 having a temperature compensated accessory output assembly 190 which is coupled to a right angle drive assembly 192, as shown in FIG. 15, which itself will be attached to an accessory, or output assembly 190 is directly attached to an accessory 194 shown generally in FIG. 16. The temperature compensated output assembly 190 can be best understood by referring first to FIG. 4. As explained previously, beveled gear 130 is attached to and driven by the cone shaft 127 and thus transfers the temperature compensated rotation of the cone 125 through the compensated bevel gear 102 and the shaft 104 by means of a coupling to the compensated index 92. The compensated rotation is coupled through various gears within the compensated index 92, which can be any of a variety of compensated indices known to those skilled in the art, with the temperature compensated rotation reaching a gear 196 within the compensated index, as shown in FIG. 4. The gear 196 meshes with a gear 198 on a worm gear shaft 200 which also has on it a first compensated worm gear 202 at one end and is coupled with a second compensated worm gear 204 by means of a coupling applied to the worm gear shaft's representing the output of the compensated register at the other end. The first compensated worm gear 202 meshes with a gear 206 within the temperature compensated index 92. As a result, the gear 206 transmits compensated rotation to the balance of the mechanism of the compensated index 92 which registers the temperature compensated amount of fluid flow through the rotary fluid meter that is being used to measure the flow of the fluid in question.

The second compensated worm gear 204, which is within the transmission assembly 88, meshes with a portion of a transfer gear 208 which has teeth that are somewhat elongated to mesh with more than one other gear. The transfer gear 208 also meshes with an output gear 210 on an output shaft 212 (not shown in FIG. 4) which is an integral portion of a universal output coupling 214 that is sometimes referred to as an output wriggler. It can be seen more clearly in FIG. 10 that the transfer gear 208 meshes with the output gear 210 keyed with the output shaft 212 to turn the universal output coupling 214. It is in this manner that the universal output coupling 214 provides a temperature compensated rotation to various accessories as shown in FIGS. 15 and 16. Referring to FIG. 15, universal output coupling 214 is attached to a coupling 216 and through a shaft 218, which is mounted within the right angled drive assembly 192. A bevel gear 220 is mounted on the opposite end of the shaft 218 from the coupling 216. The bevel gear 220 meshes with a bevel gear 222 mounted on a shaft 224, which has a universal output coupling 226 mounted on its opposite end to connect to anyone of a number of various accessories for the fluid meter. Bevel gear 220 can be arranged on the opposite side of bevel gear 222 to change the rotational direction of bevel gear 222.

Figure 18:
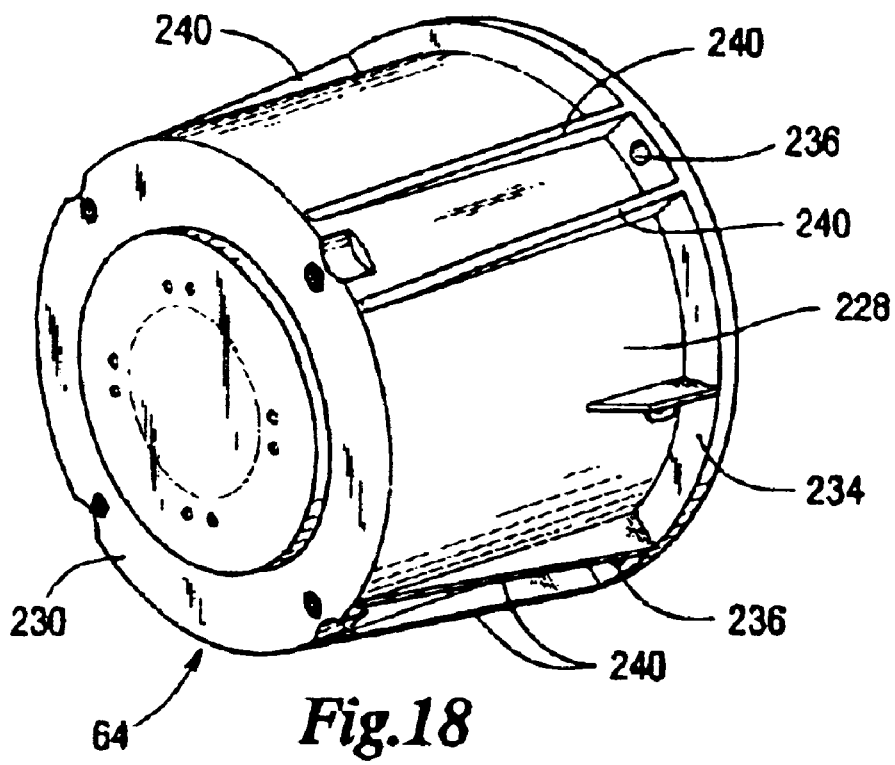
FIG. 18 is a perspective view of the front and side of a register cover of a rotary meter in accordance with one aspect of this invention.
Figure 19:
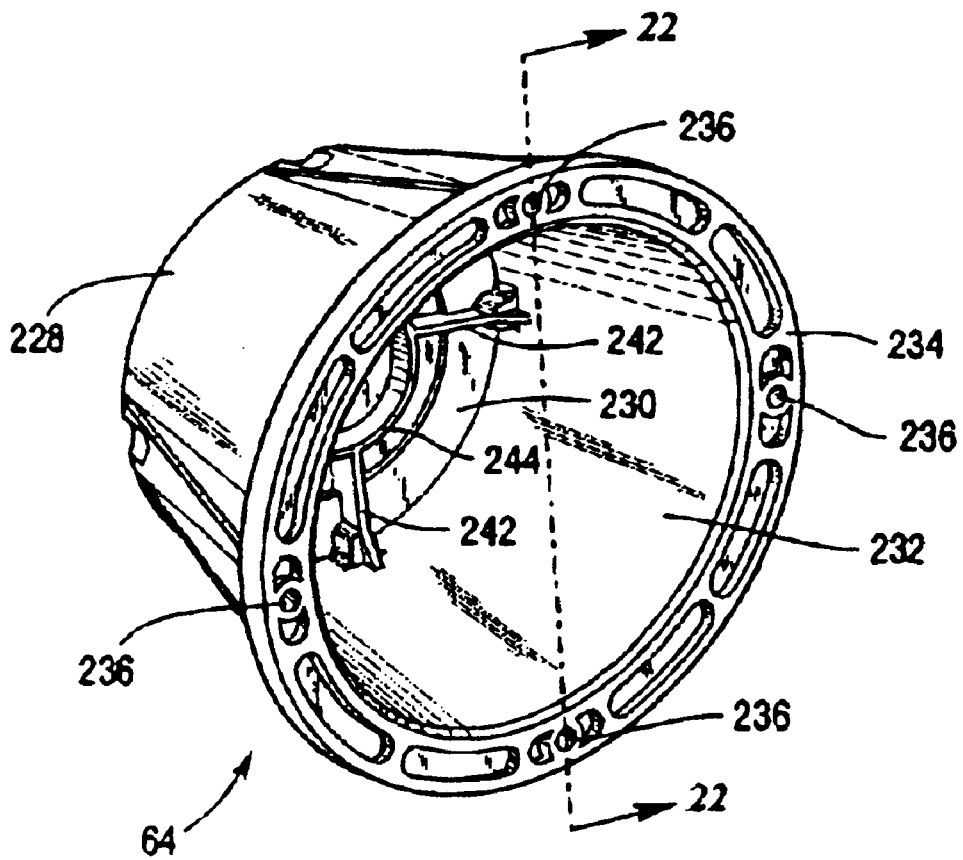
FIG. 19 is a perspective view of a side and the inside, taken from the rear of the register cover shown in FIG. 18.

As can be seen in FIGS. 15 and 16, accessories can be mounted directly onto the register cover 64. The register cover 64 is constructed in such a manner that it can support the accessories mounted on it without a need of mounting braces or other support members. Referring now to FIGS. 18 and 19, the register cover 64 comprises an elongated housing 228 that can have optionally a hole for accessories which can be made of plastic material having a frusto-conical shape, a closed end 230, also made of plastic material, and open end 332. A mounting flange 234 is included on the open end 232 of the register cover 64 and has a plurality of holes 236 within it for receiving mounting bolts used to connect the register cover to a meter housing driver side end cover. See, by way of example, FIGS. 15 and 16 in which mounting bolts 238 are inserted through holes in the mounting flange 234 and into the end of driver side end cover 38 of the rotary meter. See also FIG. 1 in which mounting bolts 66 are inserted through a mounting flange 234 and into the end of the flange driver side end cover 38.

Referring back to FIGS. 18 and 19, at least one side rib 240 is molded onto the outside of the elongated housing 228 of the register cover 64 and extends substantially along the length of the housing 228 from a location adjacent each of the plurality of mounting holes 236. In FIGS. 18 and 19, the at least one side rib comprises a pair of side ribs 240, one located on each side of each of the mounting holes 236 and extending from the flange 234 to the closed end 230 of the register cover 64.

Figure 20:
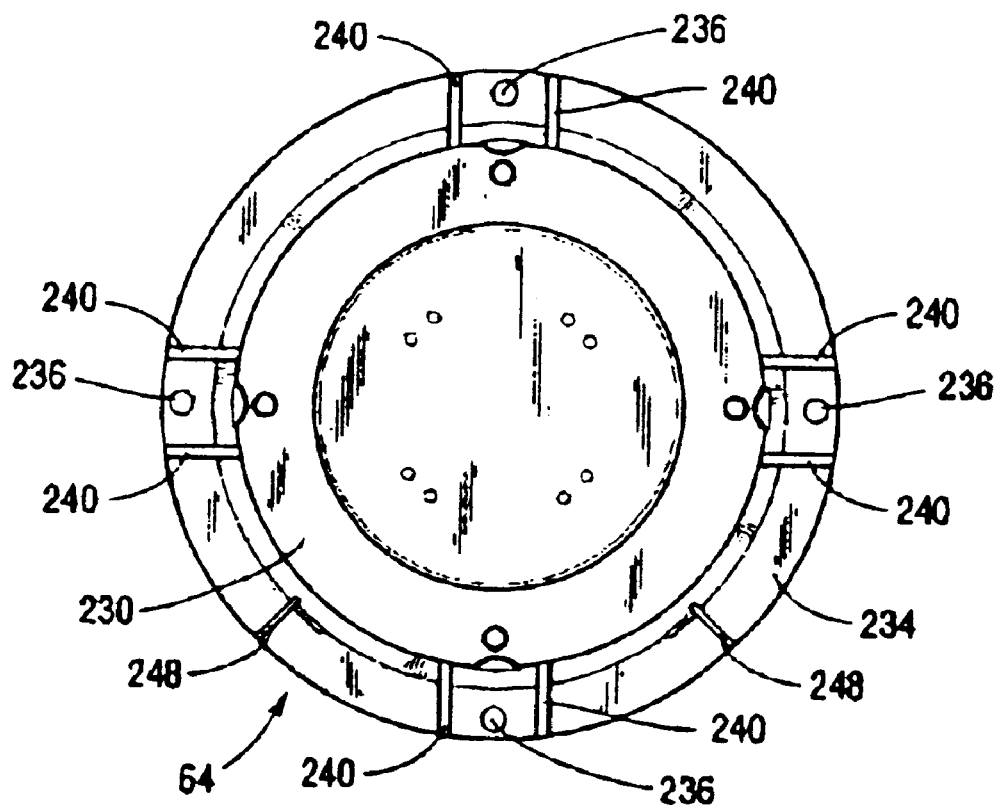
FIG. 20 is a front view of the register cover shown in FIGS. 18 and 19.
Figure 21:
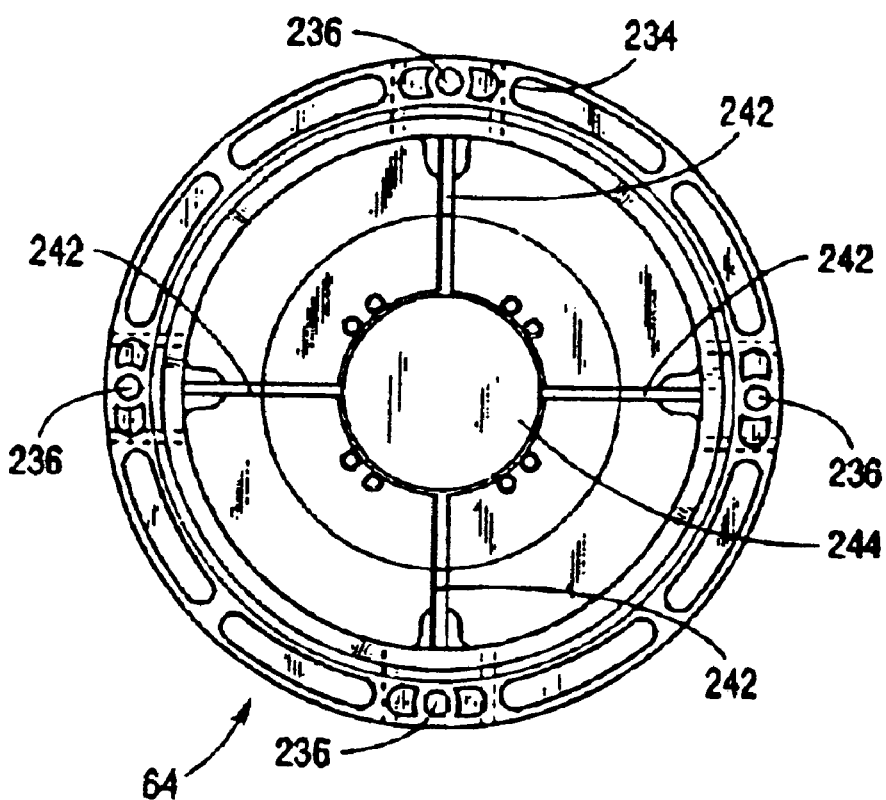
FIG. 21 is a rear view of the register cover shown in FIGS. 18–20.

The register cover 64 further includes a radially extending closure rib 242 corresponding to each pair of side ribs 240. Each closure rib is located within the register cover 64 and on the inside of the closed end 230 of the register cover 64. The closure ribs 242 each extend from an area which is between the side ribs 240 and in line with a corresponding mounting hole 236, and extend toward the center of the register cover 230. In the preferred embodiment of this invention shown in FIGS. 18 and 19, the ribs 242 terminate at an internal flange 244 which forms a circle between the closure ribs 242 on the inside of the closed end 230 of the register cover 64. The use of the pair of side ribs 240, the closure ribs 242 extending on the inside of register cover 64 from between each pair of side ribs 240 and the inside flange 244 add structural rigidity to the register cover 64 which enables accessories to be attached to the register cover without damaging it and without the need for additional structure to support the accessories. The front view of the register cover 64 shown in FIG. 20 depicts the location of four mounting holes 236 in the mounting flange 234 of one embodiment of this invention, along with a side rib 240 located on each side of each of the four mounting holes 236. The rear view of the register cover 64 shown in FIG. 21 depicts four closure ribs 242 located within the register cover 64, along with the internal flange 244 into which each of the closure ribs terminates.

Figure 22:
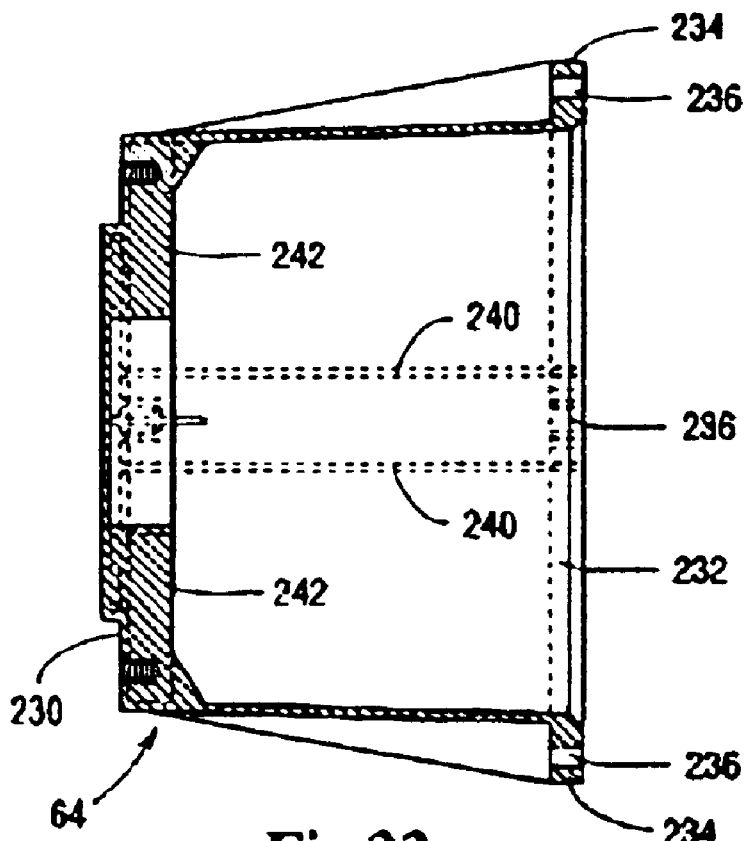
FIG. 22 is a cross sectional view of the register cover shown in FIG. 19, taken along with line 22—22.

FIG. 22 is a cross sectional view of the register cover 64 further depicting the shape and location of various components of the register cover 64.

Figure 23:
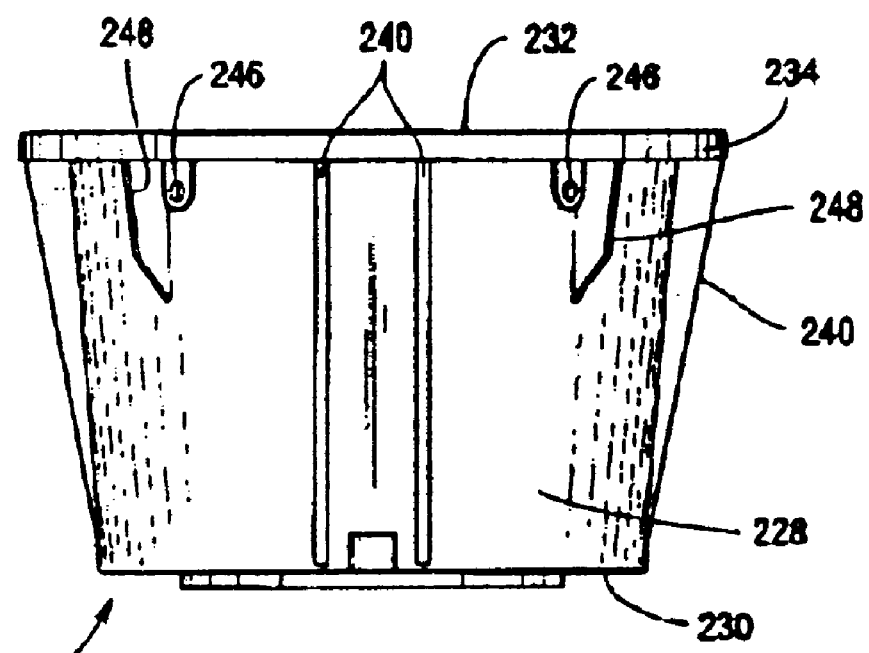
FIG. 23 is a view from the bottom of the register cover shown in FIGS. 18–22.
Figure 24:
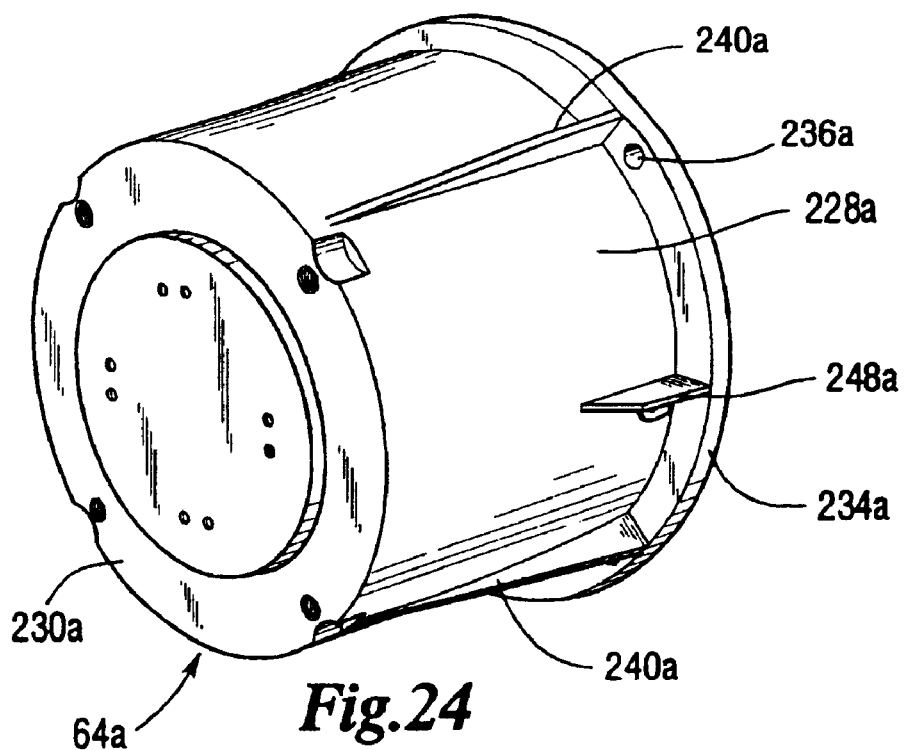
FIG. 24 is a perspective view of the front and side of a second embodiment of a register cover of a rotary meter in accordance with another aspect of this invention.

FIG. 23 is a bottom view of the register cover 64 which shows the location of a pair of weep holes 246, each having a shield 248 mounted on a side of it, which protects each of the holes from moisture. The weep holes 246 allow the release of pressure within the register cover 64 after it is installed on a meter and allow any condensate forming within the register cover 64 to drain from it. A shield 248 is placed on a side of each weep hole 246 which will inhibit rain and snow from entering into the register cover 64 through the weep holes 246.

The register cover 64 is shown in a structure which allows holes to be drilled or cut in its closed end 230 for the purpose of attaching various accessories to the register cover and for causing the accessories to be attached to the universal output coupling 214 as shown in FIGS. 15 and 16. The register cover 64 is frusto-conically shaped and its various components are shaped, as well, for aesthetic purposes, as well as to support a wide variety of accessories.

Figure 25:
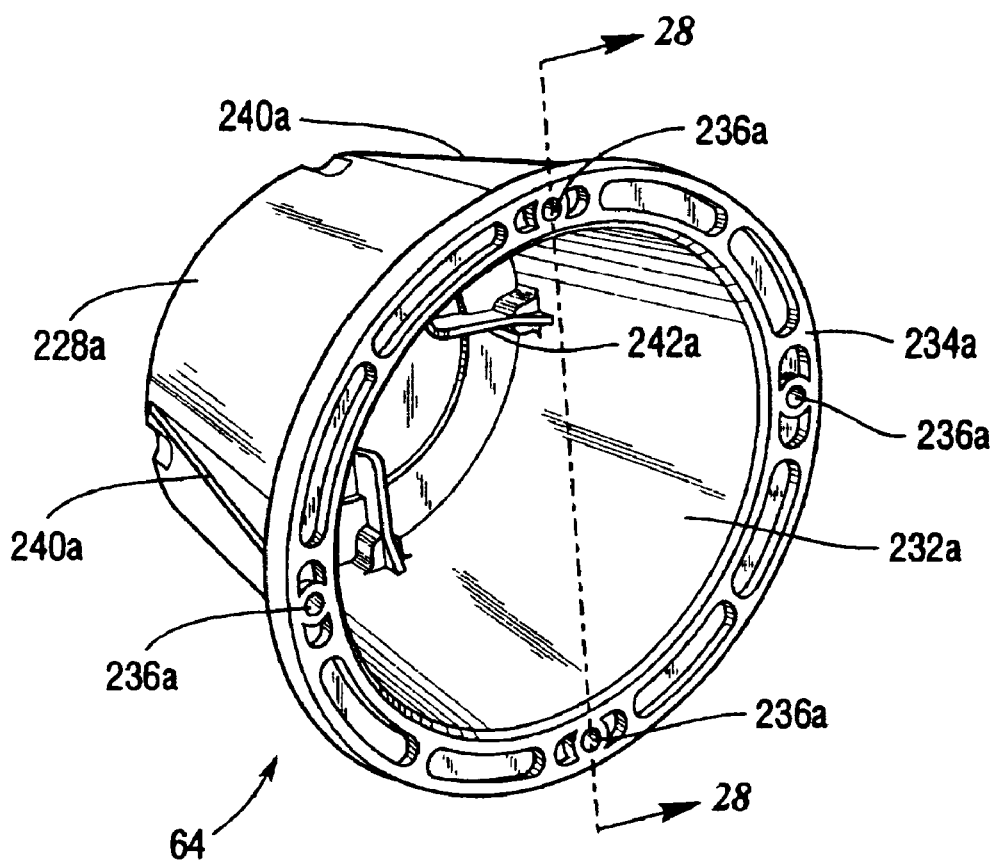
FIG. 25 is a perspective view of a side and the inside, taken from the rear of the register cover shown in FIG. 24.
Figure 26:
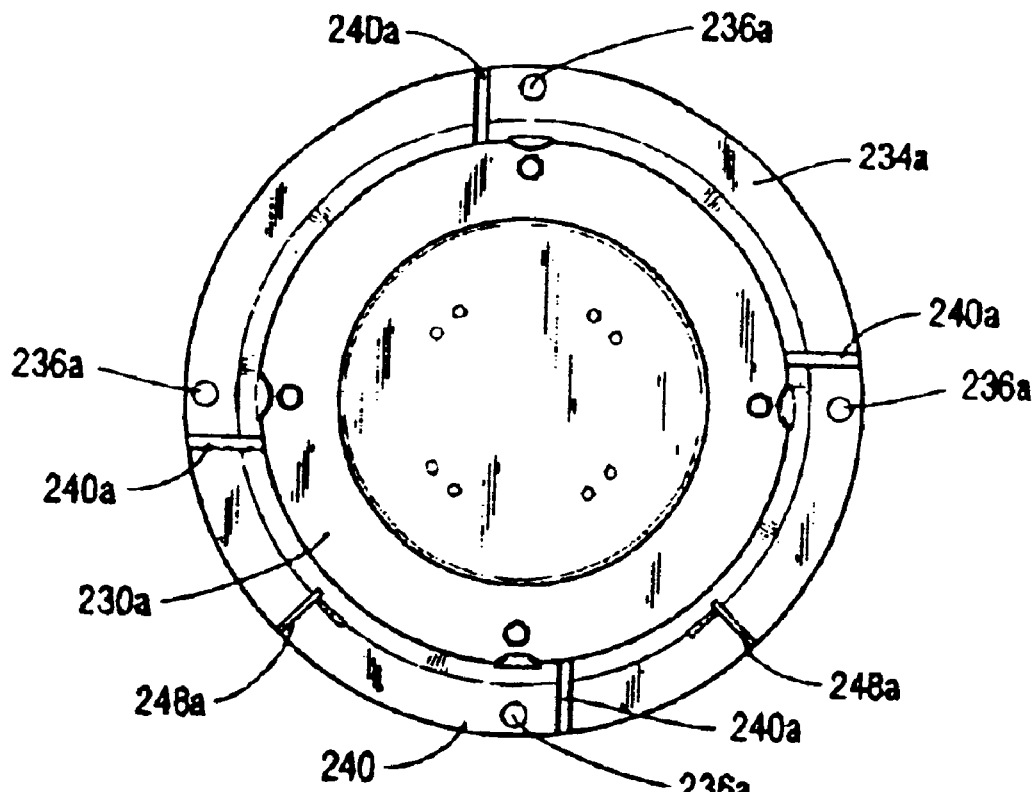
FIG. 26 is a front view of the register cover shown in FIGS. 24 and 25.
Figure 27:
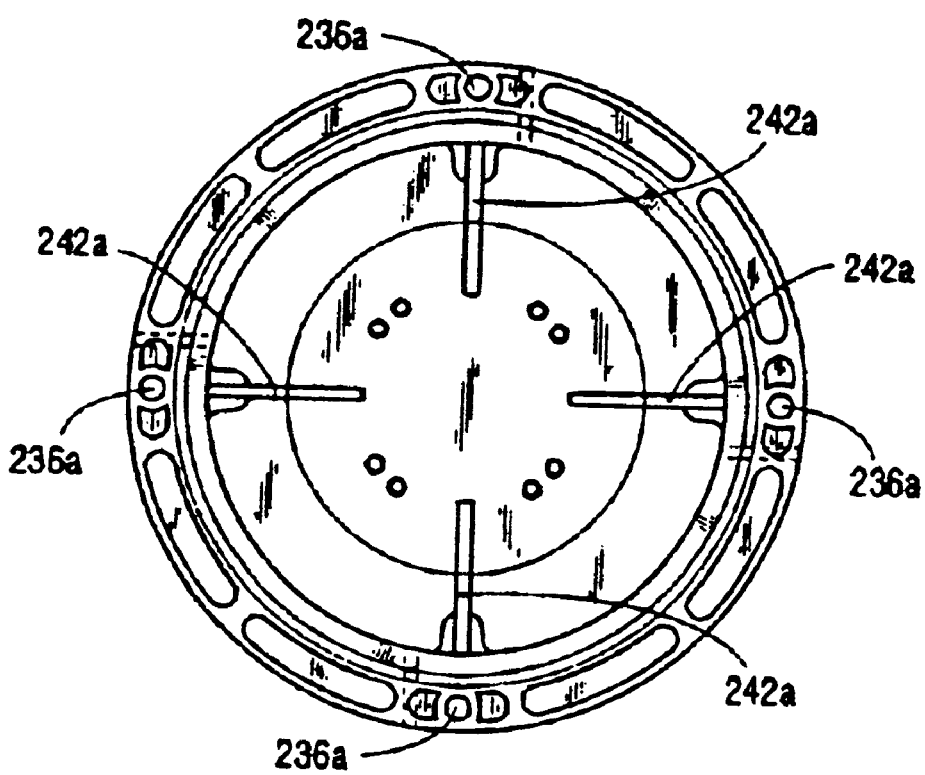
FIG. 27 is a rear view of the register cover shown in FIGS. 24–26.
Figure 28:
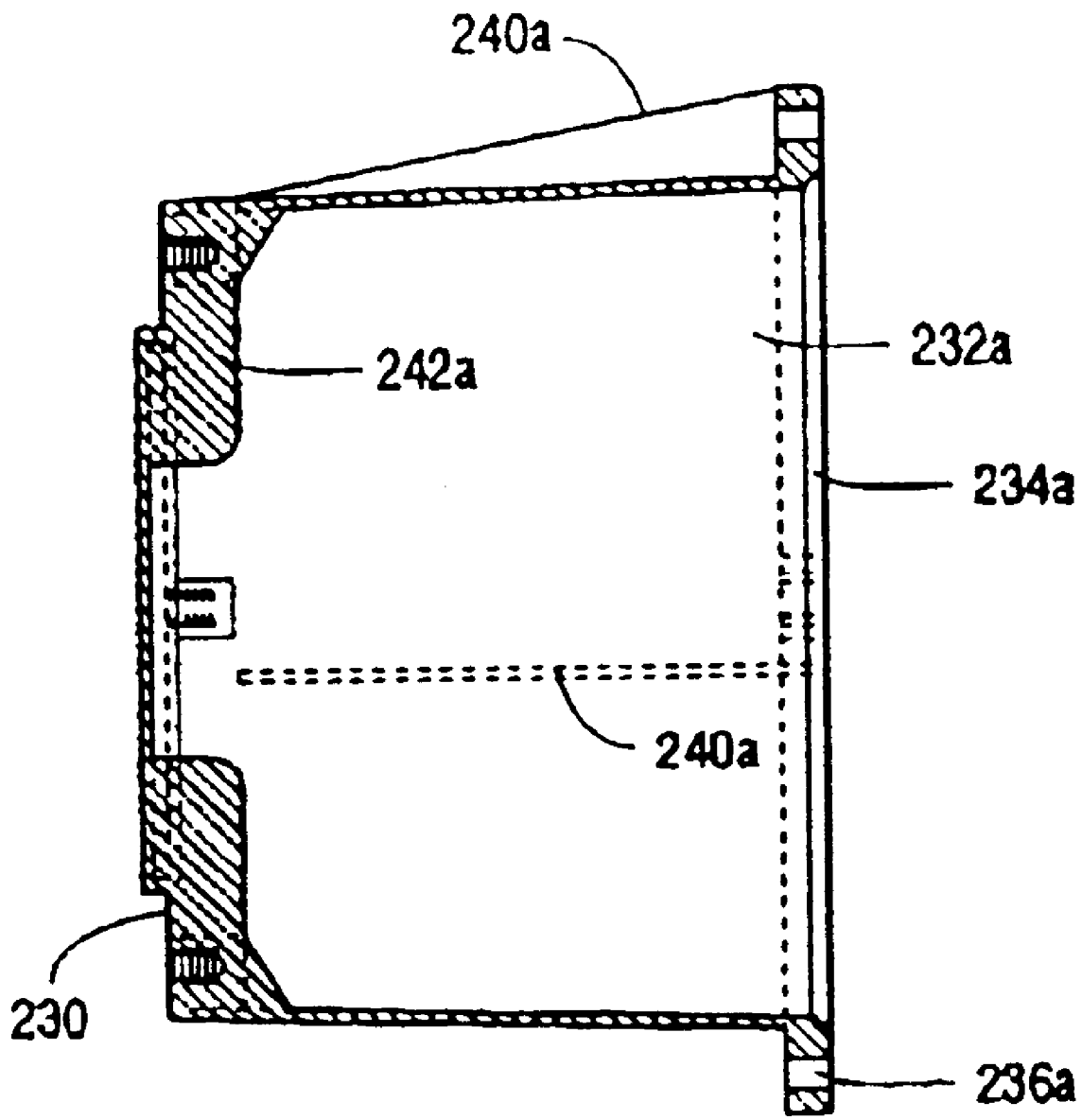
FIG. 28 is a cross sectional view of the register cover shown in FIG. 25, taken along the line 28—28.
Figure 29:
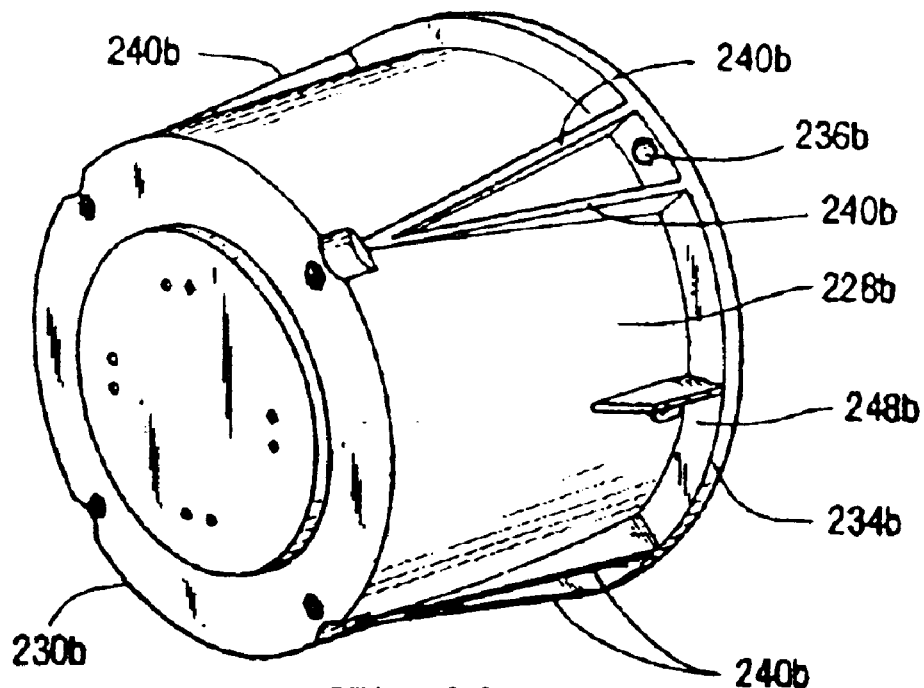
FIG. 29 is a perspective view of the front and side of another embodiment of a register cover of a rotary meter in accordance with another aspect of this invention.
Figure 30:
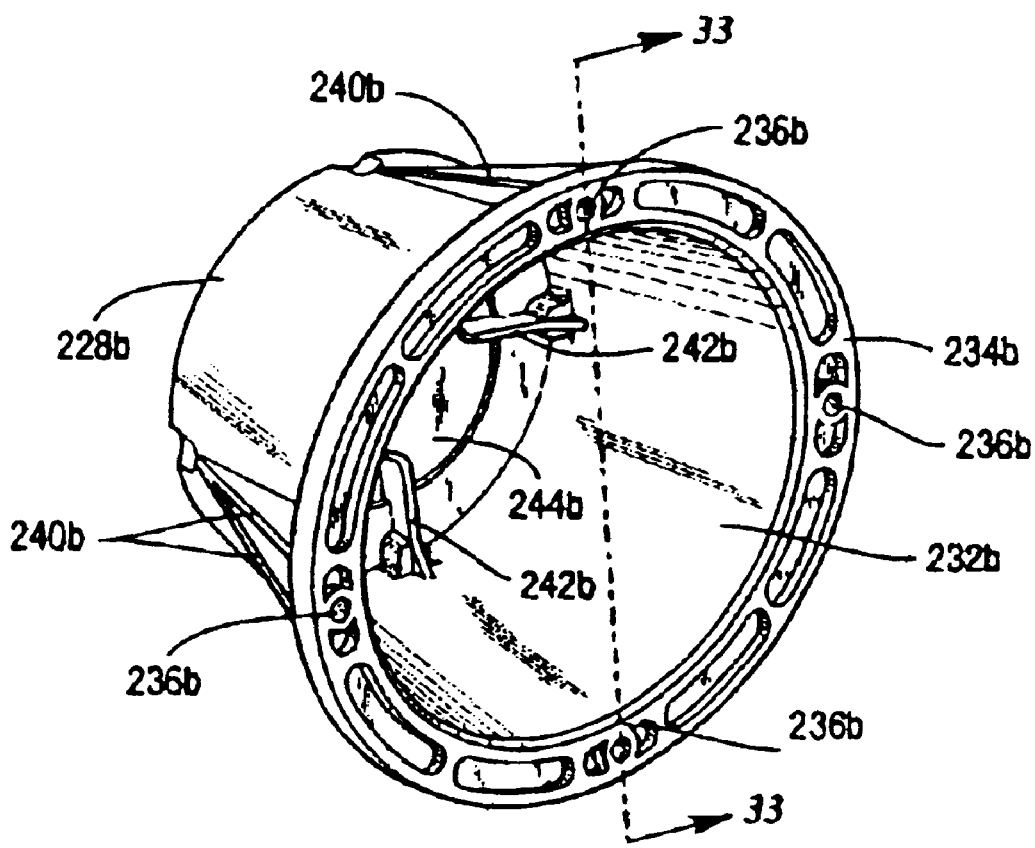
FIG. 30 is a perspective view of a side and the inside, taken from the rear of the register cover shown in FIG. 29.
Figure 31:
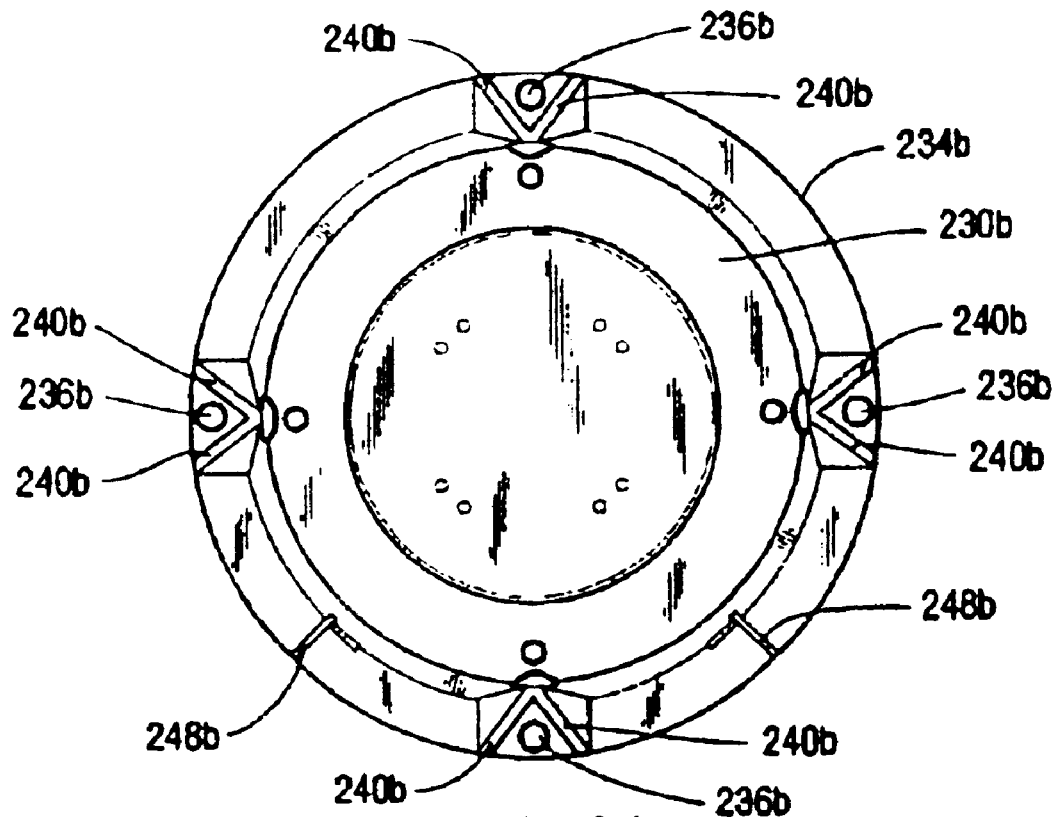
FIG. 31 is a front view of the register cover shown in FIGS. 24 and 25.
Figure 32:
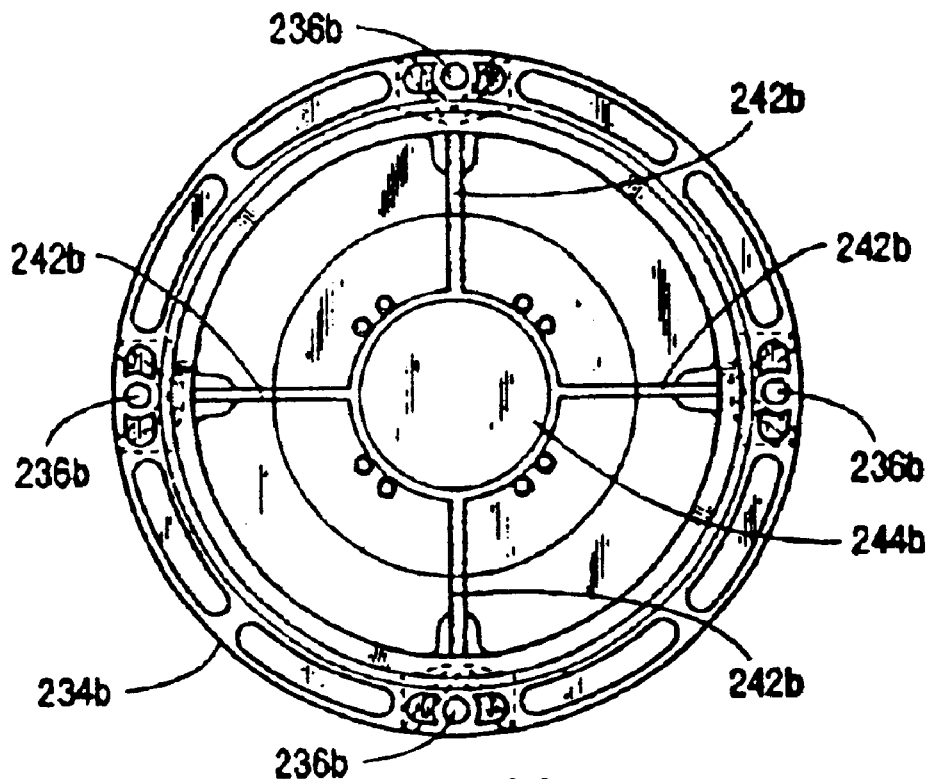
FIG. 32 is a rear view of the register cover shown in FIGS. 29–31.
Figure 33:
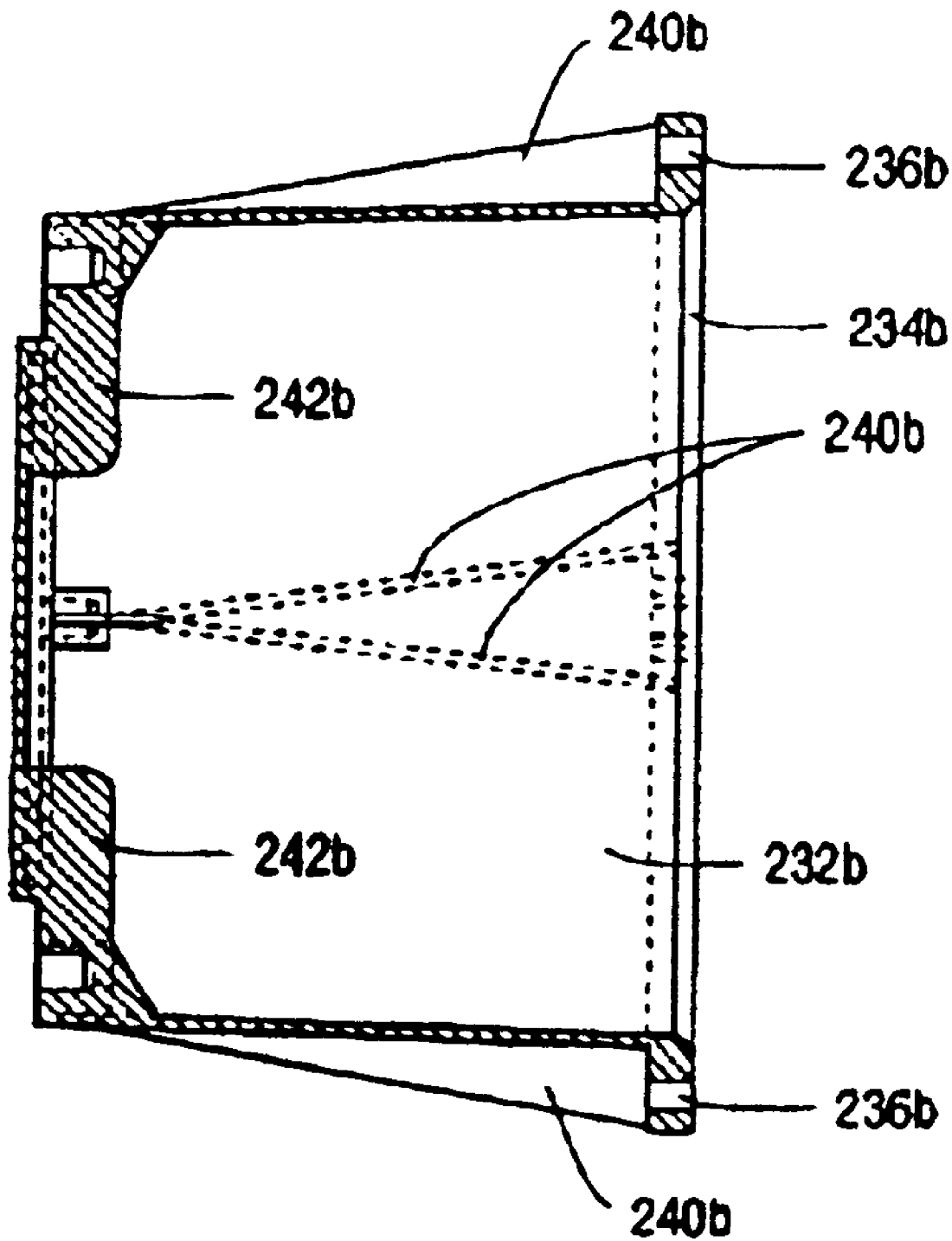
FIG. 33 is a cross sectional view of the register cover shown in FIG. 30, taken along the line 33—33.

The register cover 64 could be constructed in any of a number of variations of its features so as to accommodate the needs of those skilled in the art. For example, the mounting flange 234 could have fewer than four holes or more than four holes. Refer to FIGS. 24–28 in which components corresponding to those shown in FIGS. 18–23 are numbered similarly, followed by a letter "a." The single side rib 240a could be used with respect to each mounting bolt 238a, if desired. Additionally, a register cover having either a single side rib or two side ribs could eliminate the internal flange 244 into which the closure ribs 242 terminated as shown in FIGS. 18–23. Such a structure for the internal portion of the closed end 230a is shown in FIGS. 25 and 27.

As shown in FIGS. 29–33, in which components corresponding to those in FIGS. 18–23 are followed by a letter "b," if a pair of side ribs 240b is used and the structure can be conveniently manufactured, the side ribs themselves need not be parallel to one another, but may extend from either side of each mounting hole 238b and join together to form a V near the end of the elongated housing 228b.

Those skilled in the art will recognize that this invention has been explained with regard to the details and arrangements of the illustrated embodiment to explain the nature of this invention. Many modifications can be made to this invention by those skilled in the art without departing from its spirit and scope. Thus, the claims are intended to be interpreted to cover such equivalent rotary meters which do not depart from the spirit and scope of this invention.

What is claimed is:

1. A temperature compensated fluid meter for measuring the volume of a fluid flowing through said meter comprising, in combination:

a housing having a pressurized fluid flow chamber;

at least one impeller mounted in said housing and extending into said fluid flow chamber so as to rotate with the flow of fluid through said fluid flow chamber;

a temperature transducer mounted in said housing and having temperature sensing components, including a sensing bulb and bellows, located substantially fully within said fluid flow chamber, said sensing bulb containing liquid which expands and contracts with temperature changes, and said bellows being constructed to have an outside surface in contact with said liquid to exert a force on said liquid and having a moveable end in contact with the liquid and a stationary end, said temperature transducer also including an actuator rod attached to said moveable end of said bellows which moves substantially linearly and substantially continuously in a first direction as said bellows contracts when said liquid expands with an increase in the temperature of the fluid and which move substantially linearly and substantially continuously in a second direction as said bellows extends when said liquid contracts with a decrease in the temperature of the fluid;

a register assembly having a temperature compensated index for recording a volume of fluid flowing through said meter which is compensated for changes in the temperature of the fluid;

a transmission assembly including:

a cylinder having a cylindrical surface and an axis of rotation, a cone having a conical surface and an axis of rotation, with said axis of rotation of said cylinder and said axis of rotation of said cone being in the same plane with one another and installed at an angle with respect to one another so that the adjacent portions of said cylindrical surface and said conical surface are parallel to one another, said cylinder operatively connected to said at least one impeller to cause said cylinder to rotate in response to the rotation of said at least one impeller, and said cone operatively connected to said temperature compensated index;

a transfer ring encircling said cylinder and in driving contact between said cylindrical surface and said conical surface to cause said cone to rotate in response to the rotation of said cylinder, a transfer mechanism interconnected with said transfer ring to move said transfer ring in a direction parallel to said axis of rotation of said cylinder, said actuator rod interconnected with said transfer mechanism to cause said transfer mechanism to change the position of said transfer ring substantially linearly and substantially continuously along the axis of said cylinder in response to changes in the temperature of the fluid being measured, thereby substantially linearly and substantially continuously changing the speed of rotation of said cone with respect to said cylinder for a particular volume of fluid as the temperature of the fluid changes and causing said temperature compensated index to substantially linearly and substantially continuously adjust its measurement of a volume of fluid flowing through said meter in response to temperature changes.

2. A temperature compensated fluid meter according to claim 1 in which said bellows is a welded diaphragm bellows that has a spring constant.

3. A temperature compensated fluid meter according to claim 1 in which said bellows is a welded diaphragm bellows that has a spring constant and one end of said actuator extends within said bellows where it is attached to said movable end of said bellows.

4. A temperature compensated fluid meter according to claim 1 which has a pair of impellers and said cylinder is operatively connected to one of said impellers.

5. A temperature compensated fluid meter comprising in combination:
- a housing having a pressurized fluid flow chamber;
- at least one impeller mounted in said housing and extending into said fluid flow chamber so as to rotate with the flow of fluid through said fluid flow chamber;
- a temperature transducer mounted in said housing and having temperature sensing components located in said fluid flow chamber, an actuator assembly having a component engaging at least one of said temperature sensing components and movable in a first direction with an increase in temperature and movable in a second direction with a decrease in temperature of fluid;
- a register assembly having a temperature compensated index;
- a transmission assembly including:
  - a cylinder having a cylindrical surface and a cylinder shaft on which said cylinder is mounted, a mounting assembly for said cylinder shaft including a pair of elastomeric expanders that extend circumferentially as components of said mounting assembly, a cone having a conical surface and a cone shaft on which said cone is slideably mounted, said cylinder shaft and said cone shaft being in the same plane with one another, said cone shaft mounted at an angle toward said cylinder which causes adjacent portions of said cylindrical surface and said conical surface to be parallel with one another, a spring in contact with said cone and having a spring force to bias said cone toward said cylinder, said cylinder shaft operatively coupled to said at least one impeller to cause said cylinder to rotate in response to the rotation of said at least one impeller, and said cone shaft operatively coupled to said temperature compensated index, to cause said temperature compensated index to record a volume of fluid flow in response to rotation of said cone;
  - a transfer ring having a ring height, said transfer ring encircling said cylinder and in driving contact between said cylindrical surface and said conical surface due at least in part to the spring force on said cone to cause said cone to rotate in response to the rotation of said cylinder, said cone and said cylinder being mounted at positions such that said conical surface and said cylindrical surface are at a preselected distance from one another which is less than said ring height when said cone is at a limit of the distance said cone can travel on said cone shaft during the rotation of said cone so that a traction force is exerted on the portion of said transfer ring which is between said conical surface and said cylindrical surface, said traction force causing said elastomeric expanders which are part of said mounting assembly for said cylinder shaft to flex in response to the loading force by a predetermined amount that results in minimizing the effects of discontinuities in the dimensions of said ring, said cylinder and said cone during their rotation.

6. A temperature compensated meter according to claim 5 which further includes a transfer mechanism operatively connected to said transfer ring to move said transfer ring in a direction parallel to the axis of rotation of said cylinder, said actuator assembly interconnected with said transfer mechanism to cause said transfer mechanism to change the position of said transfer ring along the axis of the cylinder in response to changes in the temperature of the fluid being measured, thereby changing the speed of rotation in said cone with respect to the cylinder for a particular volume of fluid as the temperature of the fluid changes.

7. A temperature compensated meter according to claim 5 in which a spacer is provided to limit the distance said cone can travel on said cone shaft toward said cylinder.

8. A temperature compensated meter according to claim 5 in which a spacer located between said cone and an end of said cone shaft is a separate item from said cone.

9. A fluid meter having at least one impeller and a housing with a pressurized fluid flow chamber in which said at least one impeller is mounted, a temperature compensating transmission, a register which records a temperature compensated volume of fluid flowing through a fluid flow chamber and a register cover which encloses the said transmission assembly and register, the said register cover comprising:
- an elongated housing made of a plastic material having a rounded cross section, a length, an open end and a closed end;
- a mounting flange on said open end, said closed end comprising a closure which is made of plastic material;
- said mounting flange having a plurality of mounting holes for receiving mounting bolts used to connect said register cover to the meter housing;
- at least one side rib molded onto the outside of said housing and extending substantially along the length of the said housing from a location adjacent each of said plurality of mounting holes, a radially extending closure rib corresponding to said at least one side rib, located within said register cover and on said closure beginning near the end of said at least one side rib to which it corresponds and extending toward the center of said closure.

10. A fluid meter according to claim 9 having a register cover in which said at least one side rib comprises a pair of side ribs adjacent each of said plurality of mounting holes.

11. A fluid meter according to claim 9 having a register cover in which said at least one side rib comprises a pair of side ribs adjacent each of said plurality of mounting holes and one of said radially extending closure ribs corresponds to each pair of said side ribs.

12. A fluid meter according to claim 9 having a register cover in which said radially extending closure ribs extend toward the center of said closure and are attached to an internal flange mounted on said closure within said register cover.

13. A fluid meter according to claim 9 which includes a temperature compensated universal output coupling and further includes a right angle drive assembly attached to said register cover and coupled to said temperature compensated universal output coupling.

* * * * *